US008943012B2

(12) United States Patent
Tateno

(10) Patent No.: US 8,943,012 B2
(45) Date of Patent: Jan. 27, 2015

(54) INFORMATION PROCESSING DEVICE, INFORMATION PROCESSING METHOD, AND PROGRAM

(75) Inventor: Kei Tateno, Tokyo (JP)

(73) Assignee: Sony Corporation, Tokyo (JP)

( * ) Notice: Subject to any disclaimer, the term of this patent is extended or adjusted under 35 U.S.C. 154(b) by 237 days.

(21) Appl. No.: 13/559,099

(22) Filed: Jul. 26, 2012

(65) Prior Publication Data

US 2013/0036081 A1 Feb. 7, 2013

(30) Foreign Application Priority Data

Aug. 2, 2011 (JP) ................................ 2011-168975

(51) Int. Cl.
G06F 17/00 (2006.01)
G06N 5/02 (2006.01)
G06Q 30/02 (2012.01)

(52) U.S. Cl.
CPC .................................. *G06Q 30/0282* (2013.01)
USPC .......................................................... 706/46

(58) Field of Classification Search
None
See application file for complete search history.

(56) References Cited

U.S. PATENT DOCUMENTS 7,272,793 B2 * 9/2007 Mutsuno et al. ............... 715/707
2008/0077575 A1 * 3/2008 Tateno et al. ...................... 707/5

FOREIGN PATENT DOCUMENTS

JP 2007-058842 3/2007

OTHER PUBLICATIONS

Panagiotis Symeonidis et al., "Tag Recommendations Based on Tensor Dimensionality Reduction". RecSys "08", Oct. 23-25, 2008, pp. 43-50. Lausaunne, Switzerland.
Nozomi Kobashashi et al., "Opinion Mining From Web Documents Extraction and Structurization", Nara Institute of Science and Technology pp. 227-238.
Christopher M. Bishop, "Pattern Recognition and Machine Learning" , Journal of Statistical Software.
Vincent W. Zheng, et al., "Collaborative Filtering Meets Mobile Recommendation: A User-centered Approach", Association for the Advancement of Artificial Intelligence 2004.
Tamara G. Kolda et al., "Tensor Decompositions and Applications" SIAM Review (Jun. 10, 2008). pp. 1-47.
Deepak Agarwal, et al., "Regression-based Latent Factor Models", KDD'09, Jun. 28-Jul. 1, 2009, Paris, France, pp. 19-27.

* cited by examiner

*Primary Examiner* — Wilbert L Starks
*Assistant Examiner* — Ababacar Seck
(74) *Attorney, Agent, or Firm* — Sherr & Jiang, PLLC

(57) ABSTRACT

Provided is a n information processing device including a collection unit configured to collect meta feedback that is feedback on a combination including a content, a user, and feedback on the content of the user, and a prediction unit configured to obtain a predicted acceptance degree that is a prediction value of a degree to which an active user that is a target user accepts a combination including at least one of the content, the user, and the feedback, based on the collected meta feedback.

17 Claims, 19 Drawing Sheets

| RELATION ID | FromID | ToID |
|---|---|---|
| 1 | U1 | U2 |
| 2 | U1 | U5 |
| 3 | U2 | U1 |
| 4 | U3 | U4 |
| ... | | |

FIG. 6

| FEEDBACK ID | USER ID | CONTENT ID | FEEDBACK TYPE | FEEDBACK |
|---|---|---|---|---|
| F1 | U2 | C1 | CHARACTER STRING | "THIS IS COOL!" |
| F2 | U3 | C3 | 5-PHASE | 5 |
| F3 | U3 | C3 | OPERATION | [REPRODUCTION] |
| F4 | U1 | C2 | 5-PHASE | 2 |
| ... | | | | |

FIG. 7

| META FEEDBACK ID | USER ID | TARGET FEEDBACK ID | META FEEDBACK TYPE | META FEEDBACK |
|---|---|---|---|---|
| MF1 | U1 | F1 | CHARACTER STRING | "I AGREE WITH THAT OPINION !" |
| MF2 | U1 | F2 | OPERATION | [REPRODUCTION] |
| MF3 | U2 | F4 | THUMBS UP/DOWN | [THUMBS DOWN] |
| MF4 | U2 | F5 | PURCHASE | [PURCHASE] |
| ... | | | | |

FIG. 8

| FEEDBACK ID | ... | FEEDBACK | FEATURE QUANTITY |
|---|---|---|---|
| F1 | | "THIS IS COOL !" | " COOL", " ! " |
| F2 | | 5 | — |
| F3 | | [REPRODUCTION] | — |
| F4 | | 2 | — |
| ... | | | |

FIG. 9

| META FEEDBACK ID | ... | META FEEDBACK | FEATURE QUANTITY |
|---|---|---|---|
| MF1 | | "I AGREE WITH THAT OPINION ! " | "OPINION", "AGREE", " ! " |
| MF2 | | [REPRODUCTION] | — |
| MF3 | | [THUMBS DOWN] | — |
| MF4 | | [PURCHASE] | — |
| ... | | | |

FIG. 10

| META FEEDBACK ID | META FEEDBACK | FEATURE QUANTITY | POSITIVE/NEGATIVE |
|---|---|---|---|
| MF1 | "I AGREE WITH THAT OPINION !" | "OPINION", "AGREE", " ! " | POSITIVE |
| MF2 | [REPRODUCTION] | — | POSITIVE |
| MF3 | [THUMBS DOWN] | — | NEGATIVE |
| MF4 | [PURCHASE] | | POSITIVE |
| ... | | | |

FIG. 11

ACTIVE USER: A1

|    | U1 | U2 | U3 | U4 |
|----|----|----|----|----|
| C1 | 0  | 1  | 0  | -1 |
| C2 | 0  | 0  | 0  | 0  |
| C3 | 0  | 0  | 1  | 0  |
| C4 | 0  | 0  | 0  | 0  |

FIG. 12

ACTIVE USER: A2

|    | U1 | U2 | U3 | U4 |
|----|----|----|----|----|
| C1 | 0  | 0  | 0  | 0  |
| C2 | 1  | 0  | 0  | -1 |
| C3 | 0  | 0  | 1  | 0  |
| C4 | -1 | 0  | 0  | 0  |

FIG. 13

ACTIVE USER: A3

|    | U1 | U2 | U3 | U4 |
|----|----|----|----|----|
| C1 | 0  | 0  | 0  | 1  |
| C2 | -1 | 1  | 0  | 1  |
| C3 | 0  | 1  | 0  | 0  |
| C4 | 1  | 0  | 0  | 0  |

FIG. 14

|    | 1       | 2       |
|----|---------|---------|
| A1 | -0.1983 | -0.3669 |
| A2 | -0.5002 | 0.0875  |
| A3 | 0.8429  | 0.9261  |

FIG. 15

|    | 1       | 2       |
|----|---------|---------|
| C1 | 0.2195  | −0.5065 |
| C2 | 0.8823  | 0.7497  |
| C3 | 0.2648  | 0.4256  |
| C4 | −0.3215 | 0.0167  |

FIG. 16

|    | 1       | 2       |
|----|---------|---------|
| U1 | −0.6806 | −0.7096 |
| U2 | 0.1234  | 0.4995  |
| U3 | −0.0613 | −0.0131 |
| U4 | 0.7196  | −0.4969 |

FIG. 17

|     | 1      | 2      |
|-----|--------|--------|
| $\lambda$ | 2.7685 | 2.1871 |

FIG. 18

| EVALUATION TARGET TUPLE | CONTENT FEATURE QUANTITY ||||||| USER FEATURE QUANTITY |||||| FEEDBACK FEATURE QUANTITY |||||
|---|---|---|---|---|---|---|---|---|---|---|---|---|---|---|---|---|---|---|
| | GENRE ROCK | GENRE POPS | GENRE JAZZ | TEMPO | VOLUME | RHYTHM INSTRUMENT RATIO | ... | MALE | FEMALE | TWENTIES OR LOWER | THIRTIES | FORTIES OR HIGHER | ... | COOL | ! | ... | FEATURE QUANTITY 4 | FEATURE QUANTITY 5 | ... |
| (C1, U2, F1) | 1 | 0 | 0 | 40 | 55 | 40 | | 1 | 0 | 0 | 1 | 0 | | 1 | 1 | | 0 | 0 | |
| (C1, U4, F6) | 1 | 0 | 0 | 25 | 35 | 15 | | 1 | 0 | 0 | 1 | 0 | | 0 | 0 | | 0 | 0 | |
| (C3, U3, F7) | 0 | 1 | 1 | 20 | 30 | 25 | | 0 | 1 | 1 | 0 | 0 | | 0 | 0 | | 1 | 0 | |
| ... | | | | | | | | | | | | | | | | | | | |

| ACTIVE USER | CONTENT FEATURE QUANTITY | | | | | | | USER FEATURE QUANTITY | | | | | | FEEDBACK FEATURE QUANTITY | | | | | |
|---|---|---|---|---|---|---|---|---|---|---|---|---|---|---|---|---|---|---|---|
| | GENRE ROCK | GENRE POPS | GENRE JAZZ | TEMPO | VOLUME | RHYTHM INSTRUMENT RATIO | ... | MALE | FEMALE | TWENTIES OR LOWER | THIRTIES | FORTIES OR HIGHER | ... | COOL | ! | ... | FEATURE QUANTITY 4 | FEATURE QUANTITY 5 | ... |
| A1 | 0.85 | 0.20 | -0.42 | 0.021 | 0.152 | 0.002 | | 0.51 | 0.22 | 0.11 | 0.53 | 0.33 | | 0.79 | 0.35 | | 1.24 | 0.80 | |
| A2 | | | | | | | | 0.13 | 0.74 | ... | | | | | | | | | |
| A3 | | | | | | | | 0.53 | 0.55 | ... | | | | | | | | | |
| ... | | | | | | | | | | | | | | | | | | | |

FIG. 21
| CONTENT ID | USER ID | FEEDBACK ID | PREDICTED ACCEPTANCE DEGREE |
|---|---|---|---|
| C1 | U2 | F2 | 0.32 |
| C1 | U3 | F3 | 0.88 |
| C3 | U2 | F4 | 0.10 |
| C4 | U4 | F5 | 0.46 |
| C5 | U4 | F6 | 0.67 |
| ... | | | |
FIG. 22
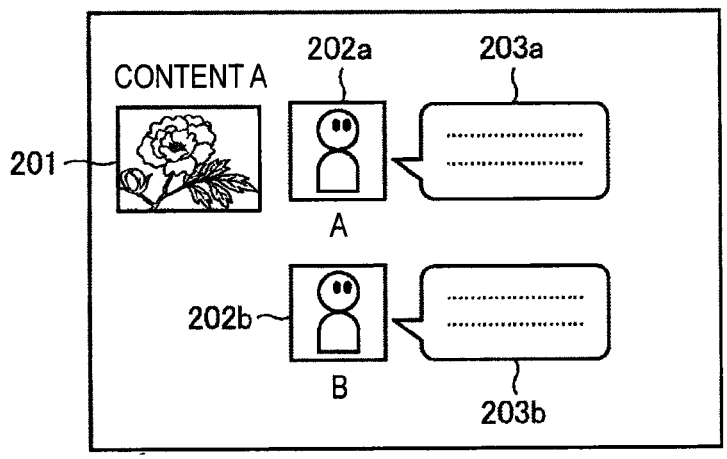
FIG. 23
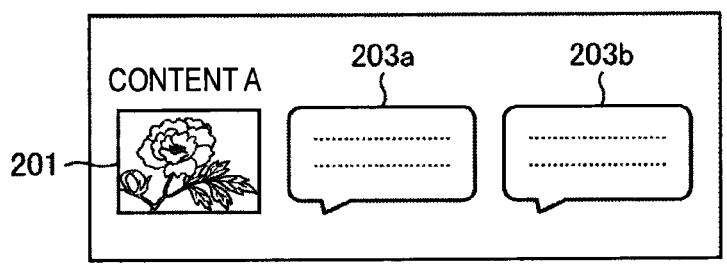

FIG. 30

| ACTIVE USER ID | CONTENT ID | USER ID | FEEDBACK ID | PREDICTED ACCEPTANCE DEGREE |
|---|---|---|---|---|
| U1 | C1 | U2 | F102 | 0.32 |
| U1 | C1 | U3 | F103 | 0.88 |
| U1 | C3 | U2 | F104 | 0.21 |
| U1 | C4 | U4 | F105 | 0.54 |
| U1 | C5 | U4 | F106 | 0.73 |
| U2 | C1 | U3 | F103 | 0.41 |
| U2 | C4 | U1 | F107 | 0.54 |
| U2 | C4 | U4 | F105 | 0.63 |
| U2 | C5 | U4 | F106 | 0.15 |
| U3 | C1 | U2 | F102 | 0.65 |
| U3 | C4 | U1 | F107 | 0.60 |
| U3 | C4 | U4 | F105 | 0.78 |
| U3 | C3 | U2 | F104 | 0.23 |
| U3 | C5 | U4 | F106 | 0.54 |
| U4 | C1 | U2 | F102 | 0.42 |
| U4 | C1 | U3 | F103 | 0.64 |
| U4 | C3 | U2 | F104 | 0.90 |
| U4 | C4 | U1 | F107 | 0.34 |

FIG. 31

| ACTIVE USER ID | CONTENT ID | USER ID | FEEDBACK ID | PREDICTED ACCEPTANCE DEGREE |
|---|---|---|---|---|
| U1 | C1 | U2 | F102 | 0.32 |
| U3 | C1 | U2 | F102 | 0.65 |
| U4 | C1 | U2 | F102 | 0.42 |
| U1 | C1 | U3 | F103 | 0.88 |
| U2 | C1 | U3 | F103 | 0.41 |
| U4 | C1 | U3 | F103 | 0.64 |
| U1 | C3 | U2 | F104 | 0.21 |
| U3 | C3 | U2 | F104 | 0.23 |
| U4 | C3 | U2 | F104 | 0.9 |
| U2 | C4 | U1 | F107 | 0.54 |
| U3 | C4 | U1 | F107 | 0.6 |
| U4 | C4 | U1 | F107 | 0.34 |
| U1 | C4 | U4 | F105 | 0.54 |
| U2 | C4 | U4 | F105 | 0.63 |
| U3 | C4 | U4 | F105 | 0.78 |
| U1 | C5 | U4 | F106 | 0.73 |
| U2 | C5 | U4 | F106 | 0.15 |
| U3 | C5 | U4 | F106 | 0.54 |

INFORMATION PROCESSING DEVICE, INFORMATION PROCESSING METHOD, AND PROGRAM

BACKGROUND

The present disclosure relates to an information processing device, an information processing method, and a program, and more particularly, to an information processing device, an information processing method, and a program that are suitable to be employed at the time of recommending content or the like.

In the technical field in which content or the like is recommended, various plans for allowing the recommended content or the like to be accepted by a user are typically devised.

For example, with collaborative filtering or the like heading the list, techniques of improving prediction accuracy of evaluation on the content by a user and recommending the content matching the preference of the user are employed.

In addition, for example, a technique of extracting keywords or the like indicating features of the recommended content and presenting the keywords or the like as a recommendation reason has been proposed (e.g., see Japanese Laid-Open Patent Publication No. 2007-58842).

SUMMARY

The recommended content or the like is thus expected to be reliably accepted by the user in the technical field in which the content or the like is recommended.

The present disclosure is made to increase the possibility of the recommended content or the like being accepted by the user.

According to a first aspect of the present disclosure, there is provided an information processing device which includes: a collection unit configured to collect meta feedback that is feedback on a combination including a content, a user, and feedback on the content of the user; and a prediction unit configured to obtain a predicted acceptance degree that is a prediction value of a degree to which an active user that is a target user accepts a combination including at least one of the content, the user, and the feedback, based on the collected meta feedback.

The information processing device may further include: a selection unit configured to select a combination including a content to be presented to the active user and at least one of the user that has given feedback on the content and the feedback, based on the predicted acceptance degree; and a presentation control unit configured to control the content included in the selected combination and at least one of the user and the feedback included in the selected combination to be presented to the active user.

The selection unit may preferentially select a combination having a higher predicted acceptance degree.

The information processing device may further include: a selection unit configured to select a combination of the content and the user that prompts provision of feedback based on the predicted acceptance degree of the active user with respect to the combination of the content and the user or the predicted acceptance degree of the active user with respect to the user; a guidance unit configured to prompt the user included in the selected combination to give feedback on the content included in the selected combination; and a presentation control unit configured to control the content included in the selected combination and at least one of the user included in the selected combination and the feedback given by the user to be presented to the active user.

The selection unit may preferentially select a combination of the content and the user having a higher predicted acceptance degree or a combination of the content and the user including the user having the higher predicted acceptance degree.

The information processing device may further include: a counting unit configured to count the predicted acceptance degrees of a plurality of active users for each user, for each feedback, or for each combination of the user and the feedback; a selection unit configured to select a combination including a content to be presented and at least one of the user and the feedback, based on the counted result of the predicted acceptance degrees; and a presentation control unit configured to control the content included in the selected combination and at least one of the user and the feedback included in the selected combination to be presented.

The selection unit may preferentially select the combination including the user and the feedback having higher predicted acceptance degrees of the plurality of active users.

The information processing device may further include: a counting unit configured to count the predicted acceptance degrees of a plurality of active users with respect to a combination of the content and the user or the predicted acceptance degrees of the plurality of active users with respect to the user for each user; a selection unit configured to select a combination of the content and the user that prompts provision of feedback, based on the counted result of the predicted acceptance degrees; a guidance unit configured to prompt the user included in the selected combination to give feedback on the content included in the selected combination; and a presentation control unit configured to control the content included in the selected combination and at least one of the user included in the selected combination and the feedback given by the user to be presented.

The selection unit may preferentially select a combination including the user having higher predicted acceptance degrees of the plurality of active users.

The information processing device may further include: a counting unit configured to count the predicted acceptance degree of the active user with respect to the combination including at least the user for each user; a selection unit configured to preferentially select the user having a higher predicted acceptance degree of the active user; and a presentation control unit configured to control the selected user to be presented to the active user.

The prediction unit may include: an acceptance model generation unit configured to generate an acceptance model for obtaining the predicted acceptance degree, based on the collected meta feedback; and an acceptance prediction unit configured to obtain the predicted acceptance degree based on the acceptance model.

According to the first aspect of the present disclosure, there is provided an information processing method which includes: by an information processing device, collecting meta feedback that is feedback on a combination including a content, a user, and feedback on the content of the user; and by the information processing device, obtaining a predicted acceptance degree that is a prediction value of a degree to which an active user that is a target user accepts a combination including at least one of the content, the user, and the feedback, based on the collected meta feedback.

According to the first aspect of the present disclosure, there is provided a program for causing a computer to execute processes including: collecting meta feedback that is feedback on a combination including a content, a user, and feedback on the content of the user; and obtaining a predicted acceptance degree that is a prediction value of a degree to which an active user that is a target user accepts a combination including at least one of the content, the user, and the feedback, based on the collected meta feedback.

According to a second aspect of the present disclosure, there is provided an information processing device which includes: a collection unit configured to collect meta feedback that is feedback on a combination including a content and feedback on the content; and a prediction unit configured to obtain a predicted acceptance degree that is a prediction value of a degree to which an active user that is a target user accepts a combination including at least one of the content and the feedback, based on the collected meta feedback.

The information processing device may further include: a selection unit configured to select a combination including a content to be presented to the active user and the feedback given on the content, based on the predicted acceptance degree; and a presentation control unit configured to control the content included in the selected combination and the feedback included in the selected combination to be presented to the active user.

The information processing device may further include: a counting unit configured to count the predicted acceptance degrees of a plurality of active users for each feedback; a selection unit configured to select a combination including the content to be presented and the feedback, based on the counted result of the predicted acceptance degrees; and a presentation control unit configured to control the content included in the selected combination and the feedback included in the selected combination to be presented.

The prediction unit may include: an acceptance model generation unit configured to generate an acceptance model for obtaining the predicted acceptance degree, based on the collected meta feedback; and an acceptance prediction unit configured to obtain the predicted acceptance degree based on the acceptance model.

According to the second aspect of the present disclosure, there is provided an information processing method which includes: by an information processing device, collecting meta feedback that is feedback on a combination including a content and feedback on the content; and by the information processing device, obtaining a predicted acceptance degree that is a prediction value of a degree to which an active user that is a target user accepts a combination including at least one of the content and the feedback, based on the collected meta feedback.

According to the second aspect of the present disclosure, there is provided a program for causing a computer to execute processes including: collecting meta feedback that is feedback on a combination including a content and feedback on the content; and obtaining a predicted acceptance degree that is a prediction value of a degree to which an active user that is a target user accepts a combination including at least one of the content and the feedback, based on the collected meta feedback.

According to the first aspect of the present disclosure, meta feedback that is feedback on a combination including a content, a user, and feedback on the content of the user is collected, and a predicted acceptance degree that is a prediction value of a degree to which an active user that is a target user accepts a combination including at least one of the content, the user, and the feedback is obtained based on the collected meta feedback.

According to the second aspect of the present disclosure, meta feedback that is feedback on a combination including a content and feedback on the content is collected, and a predicted acceptance degree that is a prediction value of a degree to which an active user that is a target user accepts a combination including at least one of the content and the feedback is obtained based on the collected meta feedback.

According to the first aspect or the second aspect of the present disclosure, the possibility of the recommended content or the like being accepted by the user can be increased.

BRIEF DESCRIPTION OF THE DRAWINGS

FIG. 6 is a diagram illustrating an example of data configuration of a feedback DB;

FIG. 7 is a diagram illustrating an example of data configuration of a meta feedback DB;

FIG. 8 is a diagram illustrating an example of data configuration of a feedback DB after feedback analysis;

FIG. 9 is a diagram illustrating an example of data configuration of a meta feedback DB after feedback analysis;

FIG. 10 is a diagram illustrating an example of data configuration of a meta feedback DB after feedback discrimination;

FIG. 11 is a diagram illustrating a specific example of data of meta feedback used to generate an acceptance model with collaborative filtering;

FIG. 12 is a diagram illustrating a specific example of data of meta feedback used to generate an acceptance model with collaborative filtering;

FIG. 13 is a diagram illustrating a specific example of data of meta feedback used to generate an acceptance model with collaborative filtering;

FIG. 14 is a diagram illustrating an example of a latent vector with respect to an active user included in an acceptance model using collaborative filtering;

FIG. 15 is a diagram illustrating an example of a latent vector with respect to content included in an acceptance model using collaborative filtering;

FIG. 16 is a diagram illustrating an example of a latent vector with respect to a user included in an acceptance model using collaborative filtering;

FIG. 17 is a diagram illustrating an example of a weight vector included in an acceptance model using collaborative filtering;

FIG. 18 is a diagram illustrating an example of feature quantities of a CUF tuple;

FIG. 21 is a diagram illustrating a first example of acceptance prediction results;

FIG. 22 is a diagram illustrating a first example of a content recommendation screen;

FIG. 23 is a diagram illustrating a second example of a content recommendation screen;

FIG. 30 is a diagram illustrating a second example of acceptance prediction results;

FIG. 31 is a diagram illustrating the acceptance prediction results of FIG. 30 sorted by content ID and user ID;

DETAILED DESCRIPTION OF THE EMBODIMENT(S)

Figure 1:
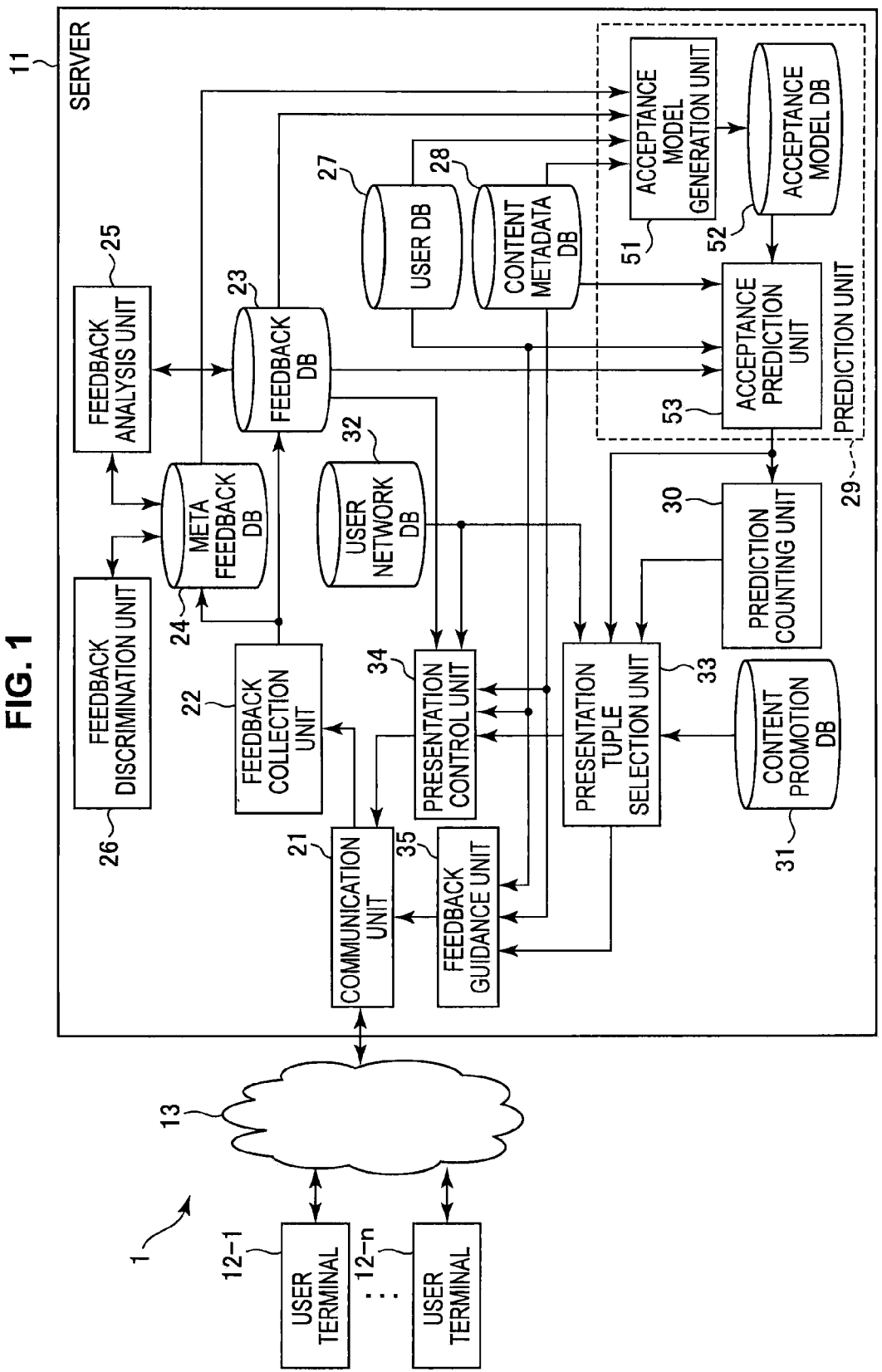
FIG. 1 is a block diagram illustrating an embodiment of an information processing system to which the present disclosure is applied.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, forms for embodying the present disclosure (which will be referred to as embodiments) will be described in the following order:

1. Embodiments
1-1. Configuration Example of Information Processing System 1
1-2. Process of Information Processing System 1
2. Modified Examples In addition, hereinafter, terms used in the present specification are defined as follows.

An active user indicates a target user to whom the content or the like is to be recommended.

Feedback is a user response to the presented content or the like, and is largely classified into explicit feedback and implicit feedback. The explicit feedback includes, for example, likes/dislikes, evaluation information such as 5-phase evaluation, a comment using tags of word level or natural sentences, and icons. The implicit feedback includes, for example, operation on a user terminal such as reproduction, stop, and skip, content purchase, and so forth.

In addition, hereinafter, feedback on a combination of a presented content, a user, and feedback on the content of the user, or feedback on a combination of the presented content and the feedback on the content is particularly referred to as meta feedback.

A CUF tuple is a combination set of three elements including the content, the user, and the feedback on the content of the user. The tuple is also employed for the set including the content, the user, and a part of the feedback in a similar way. For example, the set including the content only is referred to as a C tuple, and the set including the content and the user is referred to as a CU tuple. That is, the tuple has a plurality of types in accordance with kinds of items to be included.

In addition, hereinafter, for example, a tuple including a content Ci (i is a natural number), a user Uj (j is a natural number), and feedback Fk (k is a natural number) is represented as a (Ci, Uj, Fk) tuple.

1. EMBODIMENTS 1-1. Configuration Example of Information Processing System 1

FIG. 1 is a block diagram illustrating an embodiment of an information processing system 1 to which the present disclosure is applied.

The information processing system 1 includes a server 11 and user terminals 12-1 to 12-n. The server 11 and the user terminals 12-1 to 12-n are interconnected via a network 13.

In addition, hereinafter, when it is not necessary to individually distinguish between the user terminals 12-1 to 12-n, the user terminals are simply referred to as the user terminal 12.

The server 11 provides each user terminal 12 with the content or the like or recommends the content or the like to each user terminal.

In addition, the kind of the content is not particularly limited, and various contents such as moving images such as movies or television programs, still images such as photos or pictures, music data, electronic books, games, or document files, for example, may be employed.

The server 11 includes a communication unit 21, a feedback collection unit 22, a feedback database (DB) 23, a meta feedback DB 24, a feedback analysis unit 25, a feedback discrimination unit 26, a user DB 27, a content metadata DB 28, a prediction unit 29, a prediction counting unit 30 a content promotion DB 31, a user network DB 32, a presentation tuple selection unit 33, a presentation control unit 34, and a feedback guidance unit 35.

The communication unit 21 communicates with each user terminal 12 and transceives data via the network 13.

The feedback collection unit 22 collects feedback information by receiving feedback given by the active user or feedback information associated with meta feedback from each user terminal 12 via the network 13 and the communication unit 21. The feedback collection unit 22 stores the feedback information in the feedback DB 23 when the collected feedback information is associated with the feedback. On the other hand, the feedback collection unit 22 stores the feedback information in the meta feedback DB 24 when the received feedback information is associated with the meta feedback on the CUF tuple.

The feedback DB 23 stores information associated with the feedback given on each content by the active user. In addition, data configuration of the feedback DB 23 will be described later with reference to FIG. 6 or the like.

The meta feedback DB 24 stores information associated with the meta feedback given on each CUF tuple by the active user. In addition, data configuration of the meta feedback DB 24 will be described later with reference to FIG. 7 or the like.

The feedback analysis unit 25 analyzes the feedback stored in the feedback DB 23, and stores the analysis result in the feedback DB 23. In addition, the feedback analysis unit 25 analyzes the meta feedback stored in the meta feedback DB 24, and stores the analysis result in the meta feedback DB 24.

The feedback discrimination unit 26 discriminates whether the meta feedback stored in the meta feedback DB 24 is positive or negative, and stores the discrimination result in the meta feedback DB 24.

The user DB 27 stores information (e.g., feature quantities such as age, sex, job, residence, or the like) associated with the user that uses the information processing system 1.

The content metadata DB 28 stores metadata (e.g., feature quantities such as genres or keywords of the content, content names, images indicating the contents, and so forth) associated with the content provided by the server 11.

The prediction unit 29 predicts the degree to which each active user accepts a tuple including at least one of the content, the user, and the feedback based on the meta feedback collected from each user terminal 12, and obtains a predicted acceptance degree as the prediction value.

Here, the behavior of the active user accepting the CUF tuple includes, for example, internal behavior such as having a positive feeling about the presented CUF tuple and external behavior such as taking positive action about the presented CUF tuple. For example, the former may include having a favorable impression of or interest in the presented CUF tuple. For example, the latter may include giving positive feedback on the presented CUF tuple, purchasing the content included in the CUF tuple, using the tuple (reproduction, download, and so forth), recommending the tuple to another user, checking information associated with the corresponding content, and so forth.

In addition, the same goes for acceptance of tuples of types other than the CUF tuple, contents, users, and so forth.

The prediction unit 29 includes an acceptance model generation unit 51, an acceptance model DB 52, and an acceptance prediction unit 53.

The acceptance model generation unit 51 generates an acceptance model for obtaining the predicted acceptance degree of each active user with respect to the tuple of each type based on the meta feedback collected from each user terminal 12. That is, as will be described later, the acceptance model generation unit 51 uses the information stored in the feedback DB 23, the meta feedback DB 24, the user DB 27, and the content metadata DB 28 to generate the acceptance model with respect to the tuple of each type. The acceptance model generation unit 51 stores the generated acceptance model in the acceptance model DB 52.

The acceptance prediction unit 53 predicts the degree to which each active user accepts the tuple of each type based on the acceptance model stored in the acceptance model DB 52, and obtains the predicted acceptance degree. That is, as will be described later, the acceptance prediction unit 53 uses the information stored in the feedback DB 23, the user DB 27, the content metadata DB 28, and the acceptance model DB 52 to obtain the predicted acceptance degree of each active user with respect to the tuple of each type. The acceptance prediction unit 53 notifies the prediction counting unit 30 and the presentation tuple selection unit 33 of the prediction result.

The prediction counting unit 30 carries out various counts of the prediction results from the acceptance prediction unit 53, and notifies the presentation tuple selection unit 33 of the counted results.

In the content promotion DB 31, (ID of) the content on which a service provider of providing the service using the information processing system 1 carries out promotion such as sales promotion is registered. The content of which the content ID is registered in the content promotion DB 31 is thus preferentially recommended to the user, for example.

Figures 2, 3:
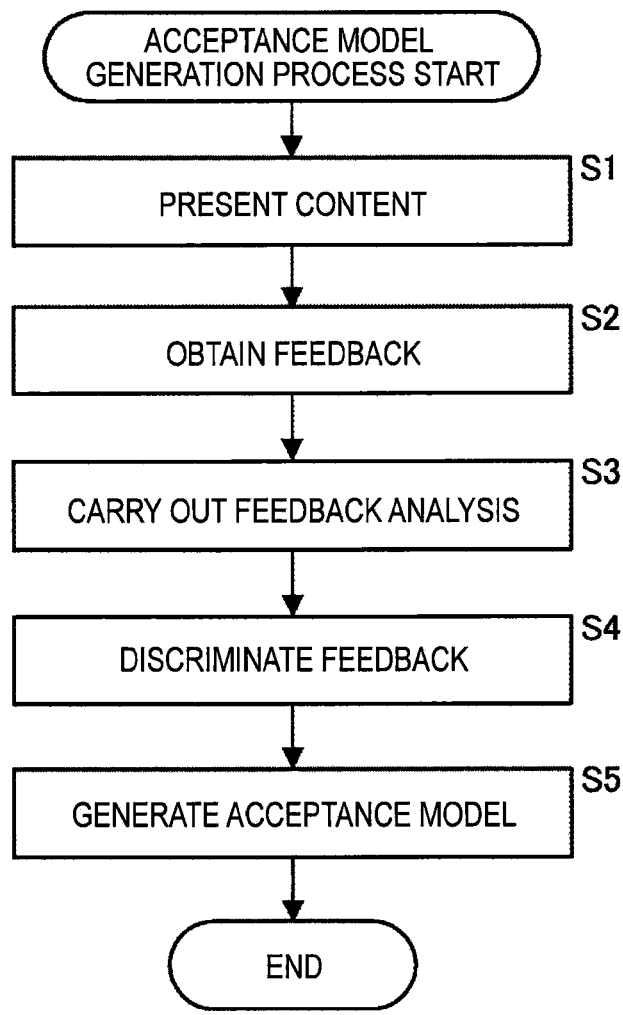
FIG. 2 is a diagram illustrating an example of data configuration of a user network DB.
FIG. 3 is a flowchart illustrating an acceptance model generation process.

The user network DB 32 is a DB in which information indicating a relation between the users using the information processing system 1 is stored. FIG. 2 illustrates an example of data configuration of the user network DB 32. The user network DB 32 includes items for a relation ID, a From ID, and a To ID.

The relation ID is an ID for identifying each relation between users.

The From ID is a user ID of the user of the follow-source.
The To ID is a user ID of the user of the follow-destination.

It is thus shown that the user U1 follows the user U2 in the record 1 of the relation ID, for example. That is, it is shown that the user U1 knows the user U2 or has an interest in the user U2. In addition, it is not necessary for the following to be bidirectional, and the following may also be only unidirectional.

The presentation tuple selection unit 33 selects the presentation tuple that is a combination including at least one of the content, the user, and the feedback to be presented to the active user based on the prediction result from the acceptance prediction unit 53, the counted result from the prediction counting unit 30, and the information stored in the content promotion DB 31 and the user network DB 32. The presentation tuple selection unit 33 notifies the presentation control unit 34 and the feedback guidance unit 35 of the selected presentation tuple.

The presentation control unit 34 generates display data for displaying the screen that presents the content or the like based on the presentation tuple selected by the presentation tuple selection unit 33 and the information stored in the feedback DB 23, the user DB 27, the content metadata DB 28, and the user network DB 32. The presentation control unit 34 transmits the generated display data to the user terminal 12 via the communication unit 21 and the network 13.

The feedback guidance unit 35 generates display data for screen display prompting the user to give feedback on a specific content based on the presentation tuple selected by the presentation tuple selection unit 33 and the information stored in the user DB 27 and the content metadata DB 28. The feedback guidance unit 35 transmits the generated display data to the user terminal 12 via the communication unit 21 and the network 13.

The user terminal 12 is also used to utilize the content presented from the server 11 or to display a variety of information, for example. In addition, the active user may use an operation unit (not shown) of the user terminal 12 to give feedback on the content or meta feedback on the CUF tuple.

In addition, for example, the user terminal 12 includes a computer system such as a personal computer, a computer game system or a home server, or a portable computer system such as a portable game machine, a cellular phone, a personal digital assistant or a portable music player.

1-2. Process of Information Processing System 1

Next, the process carried out by the information processing system 1 will be described with reference to FIG. 3 to FIG. 33.
(Feedback Collection Process)

First, an acceptance model generation process carried out by the information processing system 1 will be described with reference to the flowchart of FIG. 3.

In step S1, the server 11 presents the content. In particular, for example, the user terminal 12 transmits an instruction to present the content input by the active user to the server 11 via the network 13.

The communication unit 21 of the server 11 receives the instruction from the user terminal 12 and supplies the instruction to the presentation control unit 34. The presentation control unit 34 acquires information (metadata) associated with the content to be presented to the active user from the content metadata DB 28. In addition, the presentation control unit 34 acquires information associated with feedback on the content to be presented from the feedback DB 23. In addition, the presentation control unit 34 acquires information associated with the user that has given the feedback on the content to be presented from the user DB 27.

The presentation control unit 34 generates display data for displaying the content presentation screen for presenting the content to the active user based on the acquired information. The presentation control unit 34 then transmits the generated display data to the user terminal 12 of the active user via the communication unit 21 and the network 13.

The user terminal 12 displays the content presentation screen based on the display data received from the server 11.

Figure 4:
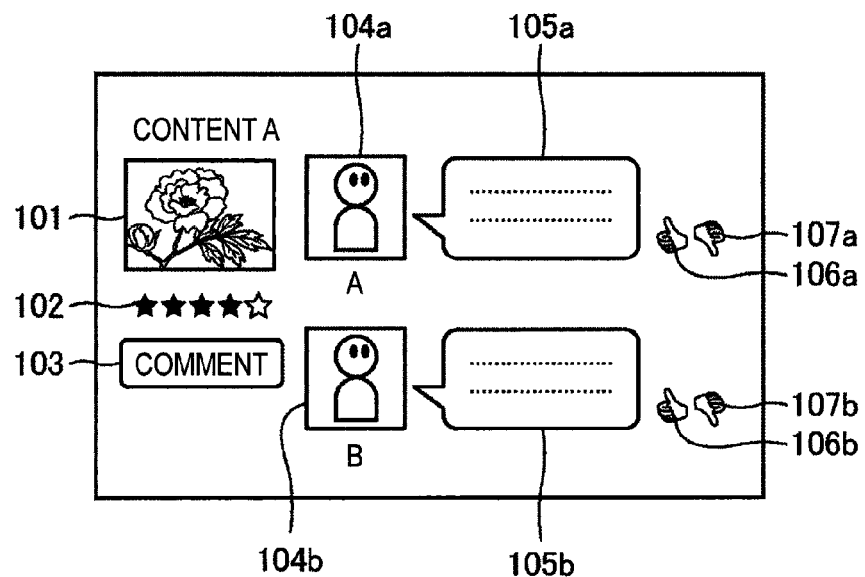
FIG. 4 is a diagram illustrating a first example of a content presentation screen.
Figure 5:
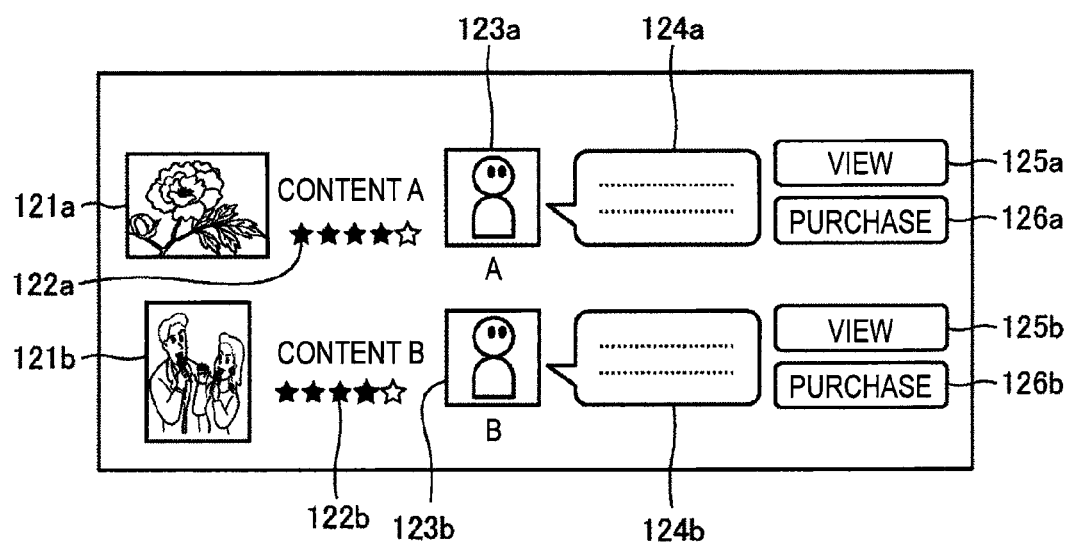
FIG. 5 is a diagram illustrating a second example of a content presentation screen.

FIGS. 4 and 5 illustrate examples of the content presentation screen.

FIG. 4 illustrates an example displaying the information associated with the content along with feedback information such as a comment or the like given by the user. In particular, a content name (content A) is displayed in an upper left corner, and an image 101 representing the content and a user evaluation 102 for the corresponding content are displayed below the content name. For example, the user evaluation 102 is represented by an average value of 5-phase evaluations given by a plurality of users. In addition, a button 103 is displayed below the user evaluation 102. A comment input screen is displayed when the button 103 is pressed, and the active user may input the comment as feedback on the content A.

In addition, information associated with the feedback on the content A is displayed in the right side of the display described above. That is, an image 104a representing the user A that has given the feedback on the content A, a user name of the user A (including a nickname or the like), and a balloon 105a including contents (e.g., a comment or the like) of the feedback given by the user A are displayed. Similarly, an image 104b representing the user B that has given the feedback on the content A, a user name of the user B, and a balloon 105b including contents of the feedback given by the user B are displayed.

In addition, a thumbs-up button 106a and a thumbs-down button 107a are displayed to the right of the balloon 104a. The active user presses the thumbs-up button 106a when the active user gives a positive evaluation (e.g., agreement, sympathy, or the like) for the feedback on the content A of the user A. On the other hand, the active user presses the thumbs-down button 107a when the active user gives a negative evaluation (e.g., disagreement, displeasure, or the like) for the feedback on the content A of the user A.

Similarly, a thumbs-up button 106b and a thumbs-down button 107b for giving an evaluation on the feedback on the content A of the user B are also displayed to the right of the balloon 104b.

Accordingly, in the content presentation screen of FIG. 4, the active user can directly give the feedback on the presented content by inputting the comment. In addition, the active user can give explicit meta feedback on the set (CUF tuple) of the presented content, the user that has given the feedback, and the given feedback by pressing the thumbs-up buttons 106a and 106b and the thumbs-down buttons 107a and 107b.

FIG. 5 illustrates an example displaying feedback information of each user in a list form. In this case, the feedback information on the content A of the user A is displayed in the first line, and the feedback information on the content B of the user B is displayed in the second line.

In particular, an image 121a representing the content A, a content name (content A), a user evaluation 122a on the content A, an image 123a representing the user A, and a balloon 124a including the feedback on the content A of the user A are displayed in the first line.

In addition, a view button 125a and a purchase button 126a are displayed to the right of the balloon 124a. The active user can view the content A by pressing the view button 125a and can purchase the content A by pressing the purchase button 126a.

Similarly, an image 121b representing the content B, a content name (content B), user evaluation 122b on the content B, an image 123b representing the user B, and a balloon 124b including the feedback on the content B of the user B are displayed in the second line. In addition, a view button 125b and a purchase button 126b are displayed to the right of the balloon 124b.

Accordingly, in the content presentation screen of FIG. 5, the active user can give implicit meta feedback on the set (CUF tuple) of the presented content, the user that has given the feedback on the content, and the given feedback by pressing the view buttons 125a and 125b and the purchase buttons 126a and 126b.

In addition, hereinafter, the thumbs-up buttons are simply referred to as a thumbs-up button 106 when it is not necessary to individually distinguish between the thumbs-up buttons 106a and 106b, and the thumbs-down buttons are simply referred to as a thumbs-down button 107 when it is not necessary to individually distinguish between the thumbs-up buttons 107a and 107b. In addition, hereinafter, the view buttons are simply referred to as a view button 125 when it is not necessary to individually distinguish between the view buttons 125a and 125b, and the purchase buttons are simply referred to as a purchase button 126 when it is not necessary to individually distinguish between the purchase buttons 126a and 126b.

In step S2, the server 11 acquires feedback. In particular, for example, the active user directly gives the feedback on the presented content by inputting the 5-phase evaluations or the comment on the content presented in the content presentation screen using a predetermined interface. Alternatively, for example, the active user gives meta feedback on the presented CUF tuple by pressing the thumbs-up button 106 and the thumbs-down button 107 of FIG. 4 or the view button 125 and the purchase button 126 of FIG. 5.

The user terminal 12 transmits the feedback given by the active user or the feedback information associated with the meta feedback to the server 11 via the network 13.

The communication unit 21 of the server 11 receives the feedback information transmitted from the user terminal 12, and supplies the feedback information to the feedback collection unit 22. The feedback collection unit 22 stores the feedback information in the feedback DB 23 when the received feedback information is associated with the feedback on the presented content. On the other hand, the feedback collection unit 22 stores the feedback information in the meta feedback DB 24 when the received feedback information is associated with the meta feedback on the presented CUF tuple.

FIG. 6 illustrates an example of data configuration of the feedback DB 23. In this case, the feedback DB 23 includes items such as a feedback ID, a user ID, a content ID, a feedback type, and feedback.

The feedback ID is an ID for identifying individual feedback.

The user ID is a user ID for allowing the user to give the feedback.

The content ID is a content ID of the content on which the feedback is given.

The feedback type indicates the type of the given feedback, and is classified into "character string," "5-phase," "operation," and so forth, for example. For example, the feedback using character information such as comment or tag is classified into "character string." The feedback using the 5-phase evaluation is classified into "5-phase." The feedback using user operations such as reproduction or skip with respect to the content is classified into "operation."

The feedback item indicates contents of the feedback actually given by the user.

For example, information indicating that the user U2 has given the feedback of the character string type on the content C1 such as "This is cool!" is stored in the record F1 of the feedback ID of FIG. 6. Information indicating that the user U3 has given the evaluation of "5" of the 5-phase evaluation on the content C3 is stored in the record F2 of the feedback ID. Information indicating that the user U3 has carried out the "reproduction" operation on the content C3 is stored in the record F3 of the feedback ID. Information indicating that the user U1 has given the evaluation "2" of the 5-phase evaluation on the content C2 is stored in the record F4 of the feedback ID.

FIG. 7 illustrates an example of data configuration of the meta feedback DB 24. In this case, the meta feedback DB 24 includes items for a meta feedback ID, a user ID, a target feedback ID, a meta feedback type, and meta feedback.

The meta feedback ID is an ID for identifying individual meta feedback.

The user ID is a user ID of the user that has given the meta feedback.

The target feedback ID corresponds to the feedback ID of the feedback DB 23 of FIG. 6, and indicates the feedback ID that is a target of the meta feedback. That is, the target feedback ID indicates the feedback ID of the feedback DB 23 corresponding to the CUF tuple to which the meta feedback is given.

The meta feedback type indicates the type of the given meta feedback, and is classified into "character string," "operation," "thumbs-up/down," "purchase," and so forth, for example. For example, the meta feedback using character information such as a comment is classified into "character string". The meta feedback using the user operation such as view is classified into "operation." The meta feedback using the thumbs-up button 106 and the thumbs-down button 107 of FIG. 4 is classified into "thumbs-up/down." The meta feedback using the content purchase is classified into "purchase."

The meta feedback item indicates contents of the meta feedback actually given by the user.

For example, information indicating that the user U1 has given the meta feedback of the character string type such as "I agree with that opinion!" on the CUF tuple in which the feedback ID of the feedback DB 23 is the record F1 is stored in the record MF1 of the meta feedback ID of FIG. 7. Information indicating that the user U1 has carried out the "reproduction" operation on the CUF tuple in which the feedback ID of the feedback DB 23 is the record F2 is stored in the record MF2 of the meta feedback ID. Information indicating that the user U2 has given the "thumbs-down" evaluation on the CUF tuple in which the feedback ID of the feedback DB 23 is the record F4 is stored in the record MF3 of the meta feedback ID. Information indicating that the user U2 has carried out the content "purchase" on the CUF tuple in which the feedback ID of the feedback DB 23 is the record F5 is stored in the record MF4 of the meta feedback ID.

In step S3, the feedback analysis unit 25 carries out feedback analysis. In particular, the feedback analysis unit 25 extracts feature elements from the feedback stored in each record of the feedback DB 23 as feature quantities. For example, the feedback analysis unit 25 uses morpheme analysis, syntax analysis, or the like to extract feature words from the feedback using natural language such as the character string type as feature quantities. The feedback analysis unit 25 then stores the extracted feature quantities in the corresponding records of the feedback DB 23.

FIG. 8 illustrates an example after the feedback analysis is carried out on the feedback DB 23 of FIG. 6. For example, two feature quantities of "cool" and "!" are extracted from the feedback "This is cool!" in the record F1 of the feedback ID.

The feedback analysis unit 25 also carries out a similar analysis process on the meta feedback DB 24.

FIG. 9 illustrates an example after the feedback analysis is carried out on the meta feedback DB 24 of FIG. 7. For example, three feature quantities of "opinion," "agree," and "!" are extracted from the meta feedback "I agree with that opinion!" in the record MF1 of the meta feedback ID.

In step S4, the feedback discrimination unit 26 carries out feedback discrimination. For example, the feedback discrimination unit 26 discriminates whether the meta feedback of each record of the meta feedback DB 24 is positive indicating agreement or negative indicating objection to the CUF tuple that is a target. In other words, the feedback discrimination unit 26 discriminates whether or not the user has accepted the CUF tuple that is the target.

For example, with regard to the meta feedback using the 5-phase evaluation or likes/dislikes, the feedback discrimination unit 26 uses values of the meta feedback as is to carry out the positive or negative discrimination.

In addition, for example, with regard to the meta feedback using the natural language, the feedback discrimination unit 26 uses positive/negative discrimination techniques or the like of subjective representation based on the feature quantities extracted from the corresponding meta feedback to carry out the positive or negative discrimination. In addition, for example, details of the positive/negative discrimination techniques of subjective representation are disclosed in N. Kobayashi, "Opinion Mining from Web Documents: Extraction and Structurization", Journal of artificial intelligence, Vol. 22, No. 2, 2007, pp. 227-238.

In addition, for example, the feedback control unit 25 considers correlation with other meta feedback or carries out the positive or negative discrimination in accordance with a predetermined rule with regard to the meta feedback using the implicit feedback. In the latter case, for example, the meta feedback is classified as positive when the meta feedback is "Reproduction" or "Thumbs-up," and is classified as negative when the meta feedback is "Stop," "Skip," or "Thumbs-down."

The feedback discrimination unit 26 then stores the discrimination result in each record of the meta feedback DB 24.

FIG. 10 illustrates an example after feedback discrimination is carried out on the meta feedback DB 24 of FIG. 9. For example, the meta feedback such as "I agree with that opinion!" "Reproduction," and "Purchase" are classified as positive, and the meta feedback such as "Thumbs-down" is classified as negative.

In addition to the simple positive or negative discrimination, for example, positive and negative degrees of the discrimination may be determined and these degrees may be numerically represented.

In addition, the discrimination result is supervised data at the time of generating a next acceptance model.

In step S5, the acceptance model generation unit 51 generates the acceptance model. That is, the acceptance model generation unit 51 uses the information stored in the feedback DB 23, the meta feedback DB 24, the user DB 27, and the content metadata DB 28 to generate the acceptance model with respect to the tuple of each type.

For example, the acceptance model for the CUF tuple is a model for predicting to what degree each user will accept each combination of the content, the user, and the feedback. In addition to the CUF tuple, the acceptance models are generated for CU, UF, CF, C, U, and F tuples.

A method of generating the acceptance model broadly includes a method using collaborative filtering and a method using CBE In addition, an example of the method using the collaborative filtering will be described.

For example, the collaborative filtering is defined as a prediction problem of a matrix including non-observed elements using the user and the content as a row and a column as described in Non-Patent Document 1 (Zheng, V. W., et al., "Collaborative Filtering Meets Mobile Recommendation: A User-centered Approach", AAAI, 2010), and additional information (metadata) associated with the user or the content is not used.

For example, the collaborative filtering for generating the acceptance model on the CUF tuple is a prediction problem of the four-dimensional arrangement (tensor) including four elements such as a user on the acceptance side (active user) added to a content, a user, and feedback. On the other hand, the collaborative filtering for generating the acceptance model on the F tuple is a prediction problem of the two-dimensional arrangement (matrix) including two elements such as the feedback and the user on the acceptance side (active user).

To predict the elements within the tensor, for example, methods described in Non-Patent Document 2 (Zheng, V. W., et al., "Collaborative Filtering Meets Mobile Recommendation: A User-centered Approach", AAAI, 2010), Non-Patent Document 3 (Symeonidis, P., et al., "Tag Recommendations Based on Tensor Dimensionality Reduction", Proceedings of Recommender Systems, 2008), and Non-Patent Document 4 (Kolda, T. G, Bader, B. W., "Tensor Decompositions and Applications", SIAM Review, 2008) may be employed.

For example, cases in which active users A1 to A3 (corresponding to the respective users U1 to U3) give meta feedback on the CU tuple (C∈{C1, C2, C3, 4}, U∈{U1, U2, U3, U4}) as shown in respective FIGS. 11 to 13 will be described.

In addition, as a value indicated in the respective items, 1 corresponds to positive meta feedback being given, −1 corresponds to negative meta feedback being given, and 0 corresponds to no meta feedback being given. For example, it is seen in FIG. 11 that the active user A1 gives no meta feedback on the (C1, U1) tuple, positive meta feedback on the (C1, U2) tuple, and negative meta feedback on the (C1, U4) tuple.

When giving the meta feedback as the value described above is carried out in the active user direction, used as a third tensor of 3×4×4, and applied to the CANDECOMP/PARAFAC decomposition described in Non-Patent Document 4, results are obtained as shown in FIGS. 14 to 17.

In addition, FIG. 14 illustrates a two-dimensional latent vector with respect to the active users A1 to A3. FIG. 15 illustrates a two-dimensional latent vector with respect to the contents C1 to C4. FIG. 16 illustrates a two-dimensional latent vector with respect to the users U1 to U4 that have given feedback. FIG. 17 illustrates a two-dimensional weight vector λ of Equation 1 that will be described later.

Here, when elements of each matrix are $\{a_{ir}\}$, $\{c_{jr}\}$, $\{u_{kr}\}$, and $\lambda=[\lambda_1, \lambda_2]$, the value $x_{ijk}$ of the original tensor is approximated as in Equation 1 below:

$$x_{ijk} = \sum_{r=1}^{2} \lambda_r a_{ir} b_{jr} c_{kr} \quad (1)$$

Equation 1 is the acceptance model. That is, the calculated value in Equation 1 is the predicted acceptance degree of the active user with respect to the CUF tuple to which the meta feedback is not given in the original tensor. The possibility that the active user will accept the CUF tuple as the target is thus high when the predicted acceptance degree is high, and is low when the predicted acceptance degree is low.

Next, an example of the method using the CBF will be described.

In the method using the CBF, for example, the acceptance model is generated based on the feature quantity of the user stored in the user DB 27, the feature quantity (metadata) of the content stored in the content metadata DB 28, and the feature quantity of the feedback described above.

For example, all feature quantities described above are used as one vector, the positive or negative discrimination result from step S4 is used as a positive or negative example, and discrimination techniques (e.g., see Non-Patent Document 5: Bishop C. M., "Pattern Recognition and Machine Learning", Springer-Verlag, 2006) such as a support vector machine or logistic regression are applied, thereby obtaining the acceptance model.

In addition, when the feedback discrimination result has three or more values such as the 5-phase, linear regression or the like is used. In addition, for example, when contents of the feedback are ignored, discrimination is carried out on a vector space only having feature quantities of the CUF tuple in a similar way to the case of the collaborative filtering.

For example, the feature quantity vector of the CUF tuple is represented as shown in FIG. 18.

In addition, values in the respective items of FIG. 18 indicate feature quantities of the respective items shown in the second or higher column of the content, the user, and the feedback included in the evaluation target tuple shown in the first column. For example, the record in the first line of FIG. 18 indicates the feature quantities of the content, the user, and the feedback included in the (C1, U2, F1) tuple that is an evaluation target tuple. In particular, the feature quantities of the items such as "genre rock," "genre pops," "genre jazz," "tempo," "volume," and "rhythm instrument ratio" of the content C1 are 1, 0, 0, 40, 55, and 40, respectively. The feature quantities of the items such as "male," "female," "twenties or lower," "thirties," and "forties or higher" of the user U1 are 1, 0, 0, 1, and 0, respectively. The feature quantities of the items such as "cool," "!", feature quantity 4, and feature quantity 5 of the feedback F1 are 1, 1, 0, and 0, respectively.

Figures 19, 20:
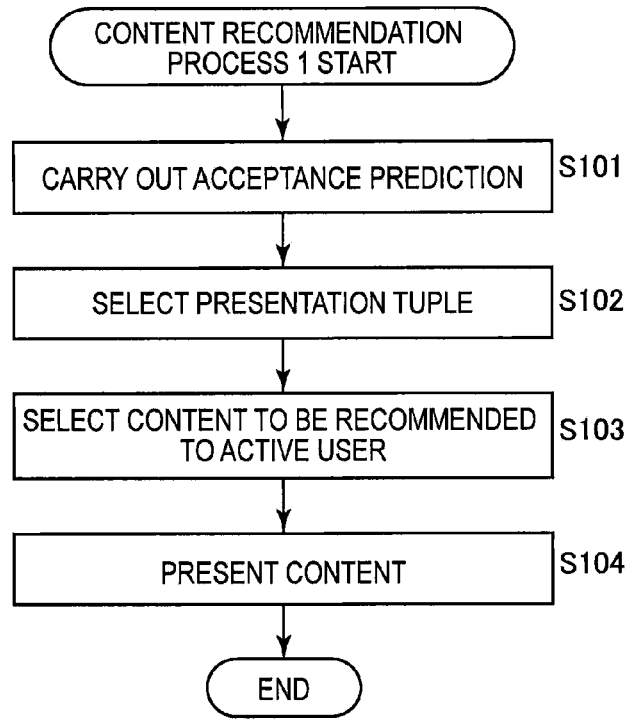
FIG. 19 is a diagram illustrating an example of weights with respect to respective feature quantities used for the acceptance model with content-based filtering (CBF)
FIG. 20 is a flowchart illustrating a first embodiment of a content recommendation process.

Learning is then carried out using logistic regression or the like based on the discrimination result of the meta feedback, thereby obtaining the weight for each feature for calculating the predicted acceptance degree with respect to the CUF tuple of each active user as shown in FIG. 19.

In addition, values of the respective items of FIG. 19 indicate weights for the respective items shown in the second or higher column of the active user shown in the first column. For example, the first record of FIG. 19 indicates the weight with respect to each item of the active user A1. In particular, the weights of the items such as "genre rock," "genre pops," "genre jazz," "tempo," "volume," and "rhythm instrument ratio" associated with the content of the active user A1 are 0.85, 0.20, −0.42, 0.021, 0.152, and 0.002, respectively. The weights of the items such as "male," "female," "twenties or lower," "thirties," and "forties or higher" associated with the user of the active user A1 are 0.51, 0.22, 0.11, 0.53, and 0.33, respectively. The weights of the features such as "cool," "!", feature quantity 4, and feature quantity 5 associated with the feedback of the active user A1 are 0.79, 0.35, 1.24, and 0.80, respectively.

An addition equation using each weight of FIG. 19 then becomes an acceptance model. That is, values that are added by multiplying the feature quantities of the content, the user, and the feedback included in the CUF tuple by the corresponding respective weights of FIG. 19 are predicted acceptance degrees of the active user with respect to the CUF tuple.

In addition, the method described above is an example of the method of generating the acceptance model, and other methods may be employed. For example, as described in Non-Patent Document 6 (Agarwal, D., Chen, B.-C., "Regression-based Latent Factor models," KDD, 2009), it is possible to use a method combining characteristics of both the collaborative filtering and the CBF.

In addition, the acceptance models for the CU tuple, the UF tuple, the CF tuple, the C tuple, the U tuple, and the F tuple are also generated in a similar way to the case of the CUF tuple.

The acceptance model generation unit 51 then stores the generated acceptance model in the acceptance model DB 52.

The process is then finished.

In addition, for example, the acceptance model generation process may be carried out whenever the processes of step S1 to S4 are carried out, whenever the feedback is collected for a given quantity, or whenever a given period has elapsed.

In addition, the description above corresponds to the example of automatically generating the acceptance model, but the acceptance model may be manually generated and stored in the acceptance model DB 52 in accordance with a predetermined rule.

(Content Recommendation Process 1)

Next, a first embodiment of the content recommendation process 1 carried out by the server 11 will be described with reference to the flowchart of FIG. 20.

In addition, in this process, the tuple having a high acceptance possibility for each active user is found and presented.

In step S101, the acceptance prediction unit 53 carries out acceptance prediction. In particular, the acceptance prediction unit 53 first selects the type of the tuple on which the acceptance prediction is carried out among the types excluding the C tuple, in other words, selects the type of the tuple used for recommending the content. One type of the CUF tuple, the CF tuple, the CU tuple, the UF tuple, the U tuple, and the F tuple is thus selected.

Next, the acceptance prediction unit 53 carries out the acceptance prediction on the active user that receives content recommendation using the acceptance model stored in the acceptance model DB 52 for each tuple of the selected type. As a result, the predicted acceptance degree of the active user with respect to each tuple of the selected type is calculated.

In addition, here, the only tuple having data in the feedback DB 23 is the prediction target. The tuple including the user that does not actually give the feedback or the feedback that is not actually given is thus excluded from the prediction target. For example, when the user U1 gives the feedback on the content C1 and does not give the feedback on the content C2, the (C1, U1) tuple is the prediction target, and the (C2, U1) tuple is excluded from the prediction target.

The acceptance prediction unit 53 then notifies the presentation tuple selection unit 33 of the prediction result.

FIG. 21 illustrates an example of the acceptance prediction result with respect to the CUF tuple when the active user is the user U1. For example, the predicted acceptance degree of the active user U1 with respect to the (C1, U2, F2) tuple is shown as 0.32.

In addition, hereinafter, the process when the acceptance prediction result of FIG. 21 is obtained using step S101 will be specifically described.

In step S102, the presentation tuple selection unit 33 selects a presentation tuple.

For example, the presentation tuple selection unit 33 selects a predetermined number of tuples in descending order of higher predicted acceptance degree as the presentation tuples. That is, the presentation tuple selection unit 33 preferentially selects the tuple having the higher predicted acceptance degree as the presentation tuple.

For example, when two presentation tuples are selected using the acceptance prediction result of FIG. 21, the (C1, U3, F3) tuple having the highest predicted acceptance degree of 0.88 and the (C5, U4, F6) tuple having the next highest predicted acceptance degree of 0.67 are selected.

Alternatively, the content recommended by an acquaintance or a person of interest tends to be readily accepted. A user associated with the active user may then be searched using the user network DB 32 and a tuple including the searched user may be preferentially selected as the presentation tuple.

For example, a predetermined weight is added to the predicted acceptance degree of the tuple including the user associated with the active user, and the presentation tuple may be selected based on the predicted acceptance degree to which the weight is added.

For example, in the user network DB 32 of FIG. 2, the user U1 as the active user follows the user U2 and the user U5. Accordingly, for example, when the weight is set to 0.5, the predicted acceptance degree with respect to the (C1, U2, F2) tuple and the (C3, U2, F4) tuple including the user U2 among the predicted acceptance degrees of FIG. 21 are added by the weights, thereby obtaining 0.82 and 0.60, respectively. Accordingly, when two presentation tuples are selected, the (C1, U3, F3) tuple having the highest predicted acceptance degree of 0.88 and the (C1, U2, F2) tuple having the next highest predicted acceptance degree of 0.82 are selected.

In step S103, the presentation tuple selection unit 33 selects the content to be recommended to the active user. In particular, when the presentation tuple selected in the process of step S102 is the UF tuple or the F tuple, the content that is a target typically exists in the feedback included in the presentation tuple. The presentation tuple selection unit 33 then selects the content that is a target of the feedback included in the presentation tuple as the content to be recommended to the active user. The presentation tuple selection unit 33 then adds the selected content to the presentation tuple (UF tuple or F tuple). As a result, the presentation tuple is the CUF tuple or the CF tuple.

In addition, when the presentation tuple selected in step S102 is the U tuple, the number of content on which the user included in the selected tuple (hereinafter referred to as a presentation user in this process) gives the feedback is not necessarily limited to one. The presentation tuple selection unit 33 thus selects the content to be recommended to the active user among the contents on which the presentation user gives the feedback.

For example, all of the contents on which the presentation user gives the feedback may be selected or the predetermined number of contents among all of the contents may be randomly selected. Alternatively, among the contents on which the presentation user gives the feedback, the content registered in the content promotion DB 31 may be preferentially selected. Alternatively, when a sales promotion cost is paid to the service provider by the content provider, the content having a high sales promotion cost may be preferentially selected among the contents on which the presentation user gives the feedback.

In addition, in this case, only the content on which the presentation user gives the positive feedback may be used as the target.

The presentation tuple selection unit 33 then adds the selected content to the presentation tuple (U tuple). As a result, the presentation tuple becomes the CU tuple.

In addition, when the presentation tuple selected in the process of step S102 is any one of the CUF tuple, the CU tuple, and the CF tuple, the content is already included in the presentation tuple. The content included in the presentation tuple is thus the content to be recommended to the active user as is.

The presentation tuple selection unit 33 then notifies the presentation control unit 34 of the presentation tuple.

In step S104, the server 11 presents the content. In particular, the presentation control unit 34 acquires information (metadata) associated with the content included in the presentation tuple from the metadata DB 28. In addition, when a user is included in the presentation tuple, the presentation control unit 34 acquires information associated with the user from the user DB 27. In addition, when feedback is included in the presentation tuple, the presentation control unit 34 acquires information associated with the feedback from the feedback DB 23.

The presentation control unit 34 generates display data for displaying a content recommendation screen for recommending the content to the active user based on the acquired information. The presentation control unit 34 then notifies the user terminal 12 of the active user of the generated display data via the communication unit 21 and the network 13.

The user terminal 12 of the active user displays the content recommendation screen based on the display data received from the server 11.

Figure 24:
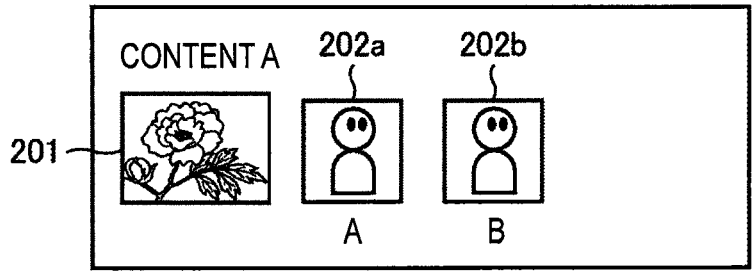
FIG. 24 is a diagram illustrating a third example of a content recommendation screen.

FIGS. 22 to 24 illustrate examples of the content recommendation screen.

FIG. 22 illustrates an example of the content recommendation screen when the presentation tuple is the CUF tuple. In particular, a content name (content A) is displayed in the upper left corner, and an image 201 indicating the content is displayed below the content name.

In addition, information associated with the feedback on the content A is displayed on the right side of the display described above. That is, the image 202*a* indicating the user A that has given the feedback on the content A, a user name of the user A, and a balloon 203*a* including contents (e.g., comment or the like) of the feedback of the user A are displayed. In a similar way, an image 202*b* indicating a user B that has given the feedback on the content A, a user name of the user B, and a balloon 203*b* including contents (e.g., a comment or the like) of the feedback of the user B are displayed.

FIG. 23 illustrates an example of the content recommendation screen when the presentation tuple is the CF tuple. In this content recommendation screen, the images 202*a* and 202*b* and the user names of the user A and the user B are not displayed in comparison with the content recommendation screen of FIG. 22. That is, information associated with the user that has given the feedback on the content A is not displayed and only contents of the feedback are displayed in the content recommendation screen.

FIG. 24 illustrates an example of the content recommendation screen when the presentation tuple is the CU tuple. In this content recommendation screen, the balloons 203*a* and 203*b* are not displayed in comparison with the content recommendation screen of FIG. 22. That is, contents of the feedback given to the content A are not displayed and only information associated with the user that has given the feedback is displayed in the content recommendation screen.

Figure 25:
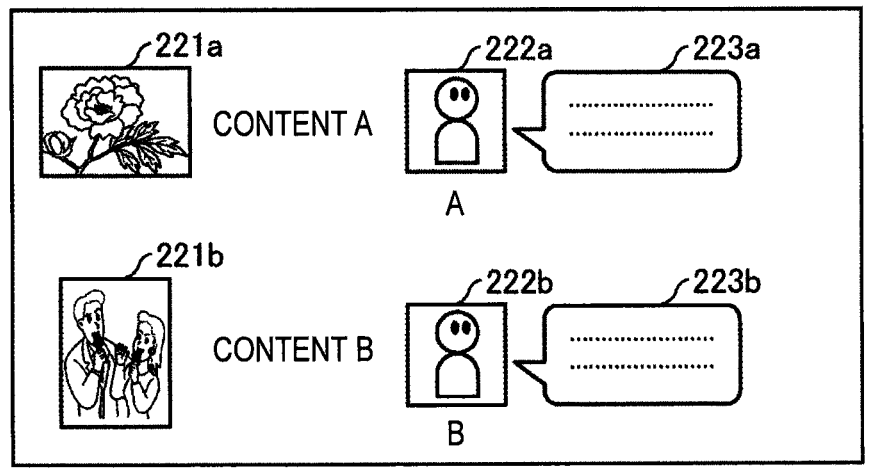
FIG. 25 is a diagram illustrating a fourth example of a content recommendation screen.
Figure 26:
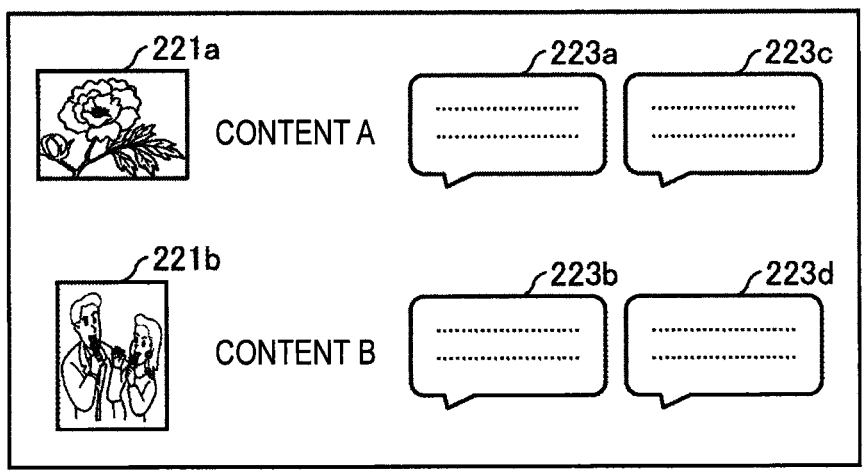
FIG. 26 is a diagram illustrating a fifth example of a content recommendation screen.
Figure 27:
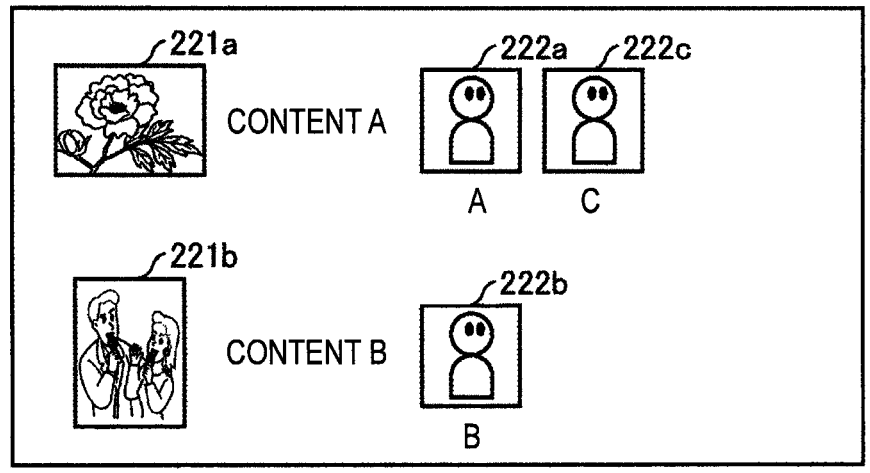
FIG. 27 is a diagram illustrating a sixth example of a content recommendation screen.

FIGS. 25 to 27 illustrate examples of a content recommendation screen when the recommended content is displayed in a list form.

FIG. 25 illustrates an example of the content recommendation screen in a list form when the presentation tuple is the CUF tuple. In this case, information associated with the content A is displayed in the first line, and information associated with the content B is displayed in the second line. In particular, an image 221*a* indicating the content A, a content name of the content A, an image 222*a* and a user name indicating the user A that has given the feedback on the content A, and a balloon 223*a* including the feedback on the content A of the user A are displayed in order from the left in the first line. Similarly, an image 221*b* indicating the content B, a content name of the content B, an image 222*b* and a user name indicating the user B that has given the feedback on the content B, and a balloon 223*b* including the feedback on the content B of the user B are displayed in order from the left in the second line.

FIG. 26 illustrates an example of the content recommendation screen in a list from when the presentation tuple is the CF tuple. In this content recommendation screen, the images 222*a* and 222*b* and the user names of the user A and the user B are not displayed in comparison with the content recommendation screen of FIG. 25. Instead, a balloon 223*c* including the feedback on the content A and a balloon 223*d* including the feedback on the content B are added. That is, information associated with the user that has given the feedback on each content is not displayed and only contents of the feedback are displayed in the content recommendation screen.

FIG. 27 illustrates an example of the content recommendation screen when the presentation tuple is the CU tuple. In this content recommendation screen, the balloons 223*a* and 223*b* are not displayed in comparison with the content recommendation screen of FIG. 25. Instead, an image 222*c* indicating the user C that has given the feedback on the content A and a user name are added. That is, contents of the feedback given to each content are not displayed and only information associated with the user that has given the feedback is displayed in the content recommendation screen.

In addition, for example, when the user U and the feedback F are included in the presentation tuple, information such as "This is the content in which User U has said 'feedback F,'" may be displayed. In this case, for example, a user associated with the active user and feedback of the user may be preferentially displayed.

In addition, for example, when only the feedback F is included and the user U is not included in the presentation tuple, information "This is the content in which 'feedback F' was said," may be displayed.

In addition, for example, when only the user U is included and the feedback F is not included in the presentation tuple, information "This is the content that User U said," may be displayed. In this case, for example, the user associated with the active user may be preferentially displayed.

In addition, images indicating users or utterance contents may be switched and displayed in accordance with contents or the like of the feedback words in the content recommendation screens of FIGS. 22 to 27.

The process is then finished.

In this way, the CUF tuple, the CF tuple, or the CU tuple having a high predicted acceptance degree is preferentially presented to the active user. The possibility that the active user will accept the presented content is thus high.

In addition, since the content and at least one of the user that gives the feedback on the content and the feedback on the content are presented, the user can know the content recommendation reason.

In addition, when the feedback is presented, since the contents of the feedback given by other user are presented as is, the recommendation reason is more clearly conveyed to the active user.

(Content Recommendation Process 2)

Next, a second embodiment of the content recommendation process 2 carried out by the server 11 will be described with reference to the flowchart of FIG. 28.

In addition, this process finds an influential user that causes the active user to readily accept the utterance or the like, prompts the found influential user to give feedback on the content, and presents the corresponding user or the corresponding feedback along with the corresponding content to the active user.

In step S121, the presentation tuple selection unit 33 selects the content to be recommended to the active user. For example, the presentation tuple selection unit 33 selects a predetermined number of contents among the contents registered in the content promotion DB 31 as the contents to be recommended to the active user (hereinafter referred to as a recommendation content).

In step S122, the presentation tuple selection unit 33 carries out acceptance prediction. In particular, the acceptance prediction unit 53 carries out the acceptance prediction on the active user with respect to the CU tuple or the U tuple using a similar process to step S101 of FIG. 20.

In addition, when the acceptance prediction is carried out on the CU tuple, the CU tuple becomes a prediction target when it includes the recommendation content.

The acceptance prediction unit 53 then notifies the presentation tuple selection unit 33 of the prediction result.

In step S123, the presentation tuple is selected in a similar way to step S102 of FIG. 21. However, when the acceptance prediction is carried out on the U tuple, the presentation tuple selection unit 33 sets the CU tuple in which the recommendation content is added to the selected presentation tuple (U tuple) as the presentation tuple.

This causes the CU tuple having a higher predicted acceptance degree of the active user to be preferentially selected as the presentation tuple when the acceptance prediction is carried out on the CU tuple. On the other hand, when the acceptance prediction is carried out on the U tuple, the CU tuple including the user (U tuple) having a higher predicted acceptance degree of the active user is selected as the presentation tuple.

The presentation tuple selection unit 33 then notifies the presentation control unit 34 and the feedback guidance unit 35 of the presentation tuple.

In addition, hereinafter, a user included in the presentation tuple is referred to as a recommender in the process.

In step S124, the feedback guidance unit 35 prompts the recommender to give feedback on the recommendation content. In particular, the feedback guidance unit 35 acquires information (metadata) associated with the recommendation content from the content metadata DB 28. The feedback guidance unit 35 generates display data for displaying a feedback guiding screen for prompting the recommender to give feedback on the recommendation content based on the acquired information. The feedback guidance unit 35 then transmits the generated display data to the user terminal 12 of the recommender via the communication unit 21 and the network 13.

The user terminal 12 of the recommender displays the feedback guiding screen based on the display data received from the server. For example, the user terminal 12 displays information of the recommendation content and a message such as "How about recommending this to Mr. X (active user)?" prompting the recommender to give feedback.

When feedback is given on the recommendation content by the recommender, the user terminal 12 of the recommender transmits feedback information associated with the given feedback to the server 11 via the network 13. The feedback collection unit 22 of the server 11 receives the feedback information via the communication unit 21 and stores the feedback information in the feedback DB 23.

In step S125, the server 11 presents the content. In particular, the presentation control unit 34 acquires information associated with the recommendation content included in the presentation tuple from the content metadata DB 28. In addition, the presentation control unit 34 acquires information associated with the recommender from the user DB 27. In addition, the presentation control unit 34 acquires information associated with the feedback on the recommendation content of the recommender from the feedback DB 23.

The presentation control unit 34 generates display data for displaying the content recommendation screen for recommending the content to the active user based on the acquired information. The presentation control unit 34 then transmits the generated display data to the user terminal 12 of the active user via the communication unit 21 and the network 13.

The user terminal 12 of the active user displays the content recommendation screen based on the display data received from the server 11.

In this case, it is considered to be important for the active user that the recommender give feedback. Accordingly, for example, information associated with the content along with words such as "This is the content that User B (recommender) said," may be displayed without displaying the feedback of the recommender.

On the other hand, only the feedback of the recommender may be presented along with the information associated with the content without presenting the recommender.

The process is then finished.

In this way, since the influential user that causes the active user to readily accept the content is presented along with the content as the recommender, the possibility that the active user will accept the presented content becomes higher.

In addition, when the recommender has already given the feedback on the recommendation content, it is possible to skip step S124.

Alternatively, for example, the CU tuple including the user that gives the feedback on the recommendation content may be excluded from acceptance prediction targets or presentation tuple targets. This causes a tuple including a user that has not yet given feedback on the recommendation content to be selected as the presentation tuple.

In addition, for example, in step S124, the recommender may not be explicitly guided to give feedback, the recommendation content may be simply recommended to the recommender, and the provision of the feedback may be awaited.

(Content Recommendation Process 3)

Next, a third embodiment of the content recommendation process 3 carried out by the server 11 will be described with reference to the flowchart of FIG. 29.

In addition, this process finds a user or feedback that is readily accepted by many active users, and preferentially presents the found user or feedback along with the content.

In step S141, the acceptance prediction unit 53 carries out acceptance prediction. In particular, the acceptance prediction unit 53 carries out the acceptance prediction of a plurality of users (active users) on any one of the CUF tuple, the CF tuple, the CU tuple, the UF tuple, the U tuple, and the F tuple using a similar process to step S101 of FIG. 20. The acceptance prediction unit 53 notifies the prediction counting unit 30 of the prediction result.

In addition, the active users that are targets carrying out the acceptance prediction may be system-wide users or a specific partial user group.

In addition, here, the only tuple having data in the feedback DB 23 is a prediction target. A tuple including a user that does not actually give feedback or feedback that is not actually given is thus excluded from the prediction target.

In step S142, the prediction counting unit 30 counts prediction results. In particular, the prediction counting unit 30 counts the predicted acceptance degree per user ID (per U tuple), per feedback ID (per F tuple), or per combination of the user ID and the feedback ID (per UF tuple), and obtains a statistic such as an average value.

Here, a specific example of the counting method will be described in a case in which the acceptance prediction result of the CUF tuple of each active user is illustrated as shown in FIG. 30.

In addition, FIG. 30 illustrates the predicted acceptance degrees of the CUF tuples of the active users, respectively. For example, the predicted acceptance degree of the (C1, U2, F102) tuple of the active user U1 is shown as 0.32. In addition, FIG. 31 illustrates the predicted acceptance degrees sorted by the content ID and the user ID of FIG. 30.

For example, a case in which the acceptance prediction result of FIG. 30 is counted for each UF tuple (combination of the user ID and the feedback ID) will be described.

For example, an average value of the predicted acceptance degrees of the respective active users of the (U2, F102) tuples is 0.463 (=(0.32+0.65+0.42)/3). In addition, an average value of the predicted acceptance degrees of the respective active users of the (U3, F103) tuples is 0.643 (=(0.88+0.41+0.64)/3).

In addition, contents that are the targets of the (U2, F102) tuples and the (U3, F103) tuples are the contents C1.

In addition, for example, an average value of the predicted acceptance degrees of the respective active users of the (U1, F107) tuples is 0.493 (=(0.54+0.60+0.34)/3). In addition, an average value of the predicted acceptance degrees of the respective active users of the (U3, F105) tuples is 0.650 (=(0.54+0.63+0.78)/3).

In addition, contents that are the targets of the (U1, F107) tuples and the (U3, F105) tuples are the contents C4.

In this way, the average values of the predicted acceptance degrees of the respective UF tuples are calculated.

When the UF tuple has a higher average value of the predicted acceptance degrees, a combination of the user and the feedback included in the UF tuple is easily accepted by more active users. In other words, it can be said that the combination is a more influential combination with respect to each active user. For example, the (U3, F103) tuple is more influential than the (U2, F102) tuple in terms of the content C1, and the (U3, F105) tuple is more influential than the (U1, F107) tuple in terms of the content C4.

In addition, the counting may be carried out not per UF tuple but per U tuple (per user ID) or per F tuple (per feedback ID).

For example, when the counting is carried out per U tuple, an average value of the predicted acceptance degrees of the respective active users of the (U2) tuples is 0.455 (=(0.32+0.65+0.42+0.21+0.23+0.9)/6).

When the U tuple has a higher average value of the predicted acceptance degrees, a user included in the U tuple is readily accepted by more active users. In other words, it can be said that the user is a more influential user with respect to each active user.

In addition, when the counting is carried out per F tuple, the feedback ID typically corresponds to one user ID, and is thus equal to the counted result per UF tuple.

The prediction counting unit 30 then notifies the presentation tuple selection unit 33 of the counted result.

In step S143, the presentation tuple selection unit 33 selects the presentation tuple based on the counted result.

For example, when the acceptance prediction is counted per UF tuple, the presentation tuple selection unit 33 selects a predetermined number of UF tuples in descending order having higher average values of the predicted acceptance degrees from the UF tuples given to each content per content. The presentation tuple selection unit 33 then sets the CUF tuple in which the content is added as a target to the selected UF tuple as the presentation tuple. The CUF tuple including the UF tuple having higher predicted acceptance degrees of a plurality of active users as acceptance prediction targets is thus preferentially selected as the presentation tuple.

For example, in the case described above, the (U3, F103) tuple having a high predicted acceptance degree is selected among the UF tuples given to the content C1. The (C1, U3, F103) tuple in which the content C1 is added to the selected (U3, F103) tuple is thus the presentation tuple.

Similarly, when the acceptance prediction is counted per F tuple, the presentation tuple selection unit 33 selects a predetermined number of F tuples having higher average values of the predicted acceptance degrees among the F tuples given to each content per content. The presentation tuple selection unit 33 then sets the CF tuple in which the content is added as a target to the selected F tuple as the presentation tuple. The CF tuple including the F tuple having higher predicted acceptance degrees of a plurality of active users as acceptance prediction targets is thus preferentially selected as the presentation tuple.

In addition, in this case, the CUF tuple to which the user that has given the feedback included in the F tuple is added may be selected as the presentation tuple.

On the other hand, when the acceptance prediction is counted per U tuple, the presentation tuple selection unit 33 selects a predetermined number of U tuples in descending order having higher average values of the predicted acceptance degrees as the presentation tuples. The F tuple (user) having higher predicted acceptance degrees of a plurality of active users as acceptance prediction targets is thus preferentially selected as the presentation tuple.

The presentation tuple selection unit 33 then notifies the presentation control unit 34 of the presentation tuple.

In step S144, the content is presented by a similar process to step S104 of FIG. 20.

For example, when the presentation tuple selected by the presentation tuple selection unit 33 is the CUF tuple, a combination of the content, the user, and the feedback included in each presentation tuple is presented to the active user. The combination of the more influential user with respect to the content and the feedback is thus preferentially presented along with each content to each active user.

Similarly, when the presentation tuple selected by the presentation tuple selection unit 33 is the CF tuple, a combination of the content and the feedback included in each presentation tuple is presented to the active user. The feedback that is more influential on the content is thus preferentially presented along with each content to each active user.

On the other hand, when the presentation tuple selected by the presentation tuple selection unit 33 is the U tuple, a user included in the presentation tuple is preferentially presented along with the content to be presented to each active user. That is, when feedback is given on the content to be presented to each active user by the user included in the presentation tuple, a combination of the corresponding content and the corresponding user is preferentially presented to each active user. The user having a higher influence on the content among the users that have given feedback on the corresponding contents is thus preferentially presented along with each content. In addition, in this case, feedback given by the corresponding user may also be presented accordingly.

The process is then finished.

In this way, when the content is presented to each active user, an influential user that causes many active users to readily accept the content, feedback, or a combination of the user and the feedback is preferentially presented. This increases the possibility that each active user will accept the presented content.

(Content Recommendation Process 4)

Figure 32:
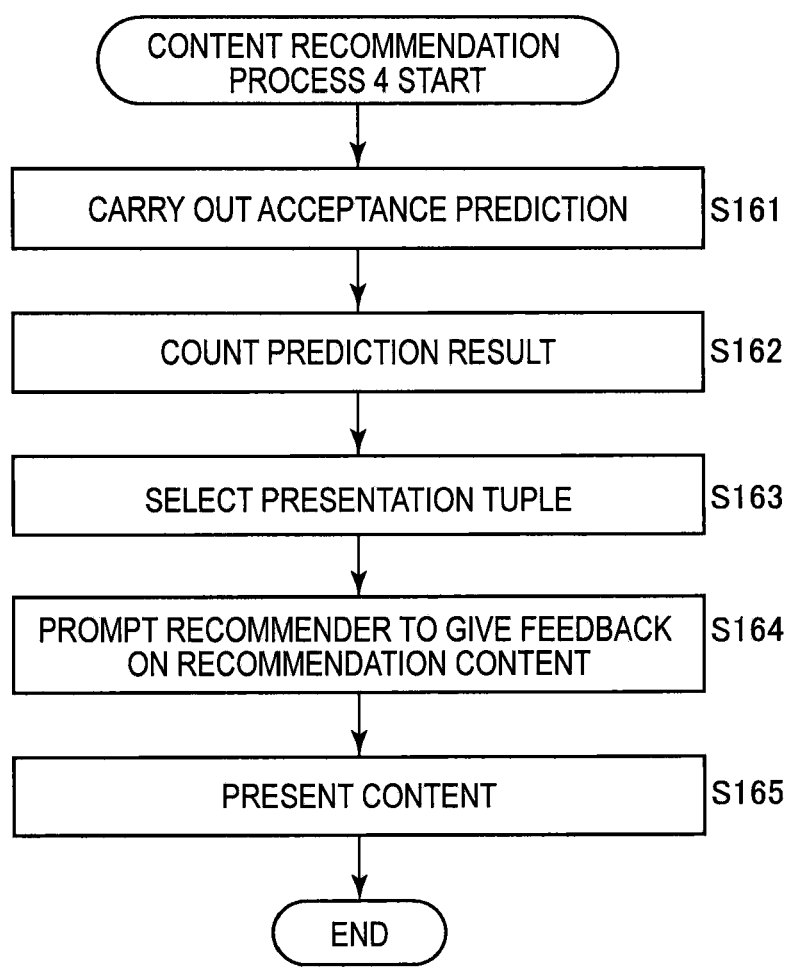
FIG. 32 is a flowchart illustrating a fourth embodiment of a content recommendation process.

Next, a fourth embodiment of the content recommendation process 4 carried out by the server 11 will be described with reference to the flowchart of FIG. 32.

In addition, this process finds an influential user (influencer) that causes many users to readily accept the utterance or the like, prompts the found user to give feedback on the content, and presents the corresponding user or the corresponding feedback along with the corresponding content.

In step S161, the acceptance prediction unit 53 carries out acceptance prediction. In particular, the acceptance prediction unit 53 uses a similar process to step S101 of FIG. 20 to carry out the acceptance prediction of a plurality of users (active users) on the CU tuple or the U tuple. The acceptance prediction unit 53 notifies the prediction counting unit 30 of the prediction result.

In addition, the active users that are targets carrying out the acceptance prediction may be system-wide users or a specific partial user group.

In step S162, the prediction counting unit 30 counts the prediction result. In particular, the prediction counting unit 30 counts the predicted acceptance degrees per user ID (per U tuple), and obtains a statistic such as an average value.

For example, when the acceptance prediction result of FIG. 30 is used, an average value of the predicted acceptance degrees of the respective active users of the U1 tuple (user U1) is 0.493 (=(0.54+0.60+0.34)/3). An average value of the predicted acceptance degrees of the respective active users of the U2 tuple (user U2) is 0.455 (=(0.32+0.21+0.65+0.23+0.42+0.90)/6). An average value of the predicted acceptance degrees of the respective active users of the U3 tuple (user U3) is 0.643 (=(0.88+0.41+0.64)/3). An average value of the predicted acceptance degrees of the respective active users of the U4 tuple (user U4) is 0.562 (=(0.54+0.73+0.63+0.15+0.78+0.54)/6).

When the U tuple has a higher average value of the predicted acceptance degrees, a user included in the U tuple is readily accepted by more active users. In other words, it can be said that the user is more influential on each active user.

The prediction counting unit 30 then notifies the presentation tuple selection unit 33 of the counted result.

In step S163, the presentation tuple selection unit 33 selects the presentation tuple. In particular, the presentation tuple selection unit 33 selects a predetermined number of U tuples in descending order having higher average values of the predicted acceptance degrees, and the user included in the selected U tuple is the recommender. The users included in the U tuple having higher predicted acceptance degrees of a plurality of active users as acceptance prediction targets are thus preferentially selected as the recommenders.

In addition, the presentation tuple selection unit 33 selects the content recommended to each active user. For example, the presentation tuple selection unit 33 selects a predetermined number of contents among the contents registered in the content promotion DB 31 as the recommendation contents.

Alternatively, for example, the presentation tuple selection unit 33 obtains an average value of the predicted acceptance degrees in each CU tuple including the recommender. The presentation tuple selection unit 33 then selects a predetermined number of CU tuples in descending order having high average values of the predicted acceptance degrees, and selects the content included in the selected CU tuple as the recommendation content.

The presentation tuple selection unit 33 sets the CU tuple including a combination of the selected recommender and the recommendation content as the presentation tuple. The presentation tuple selection unit 33 notifies the feedback guidance unit 35 and the presentation control unit 34 of the presentation tuple.

Figure 28:
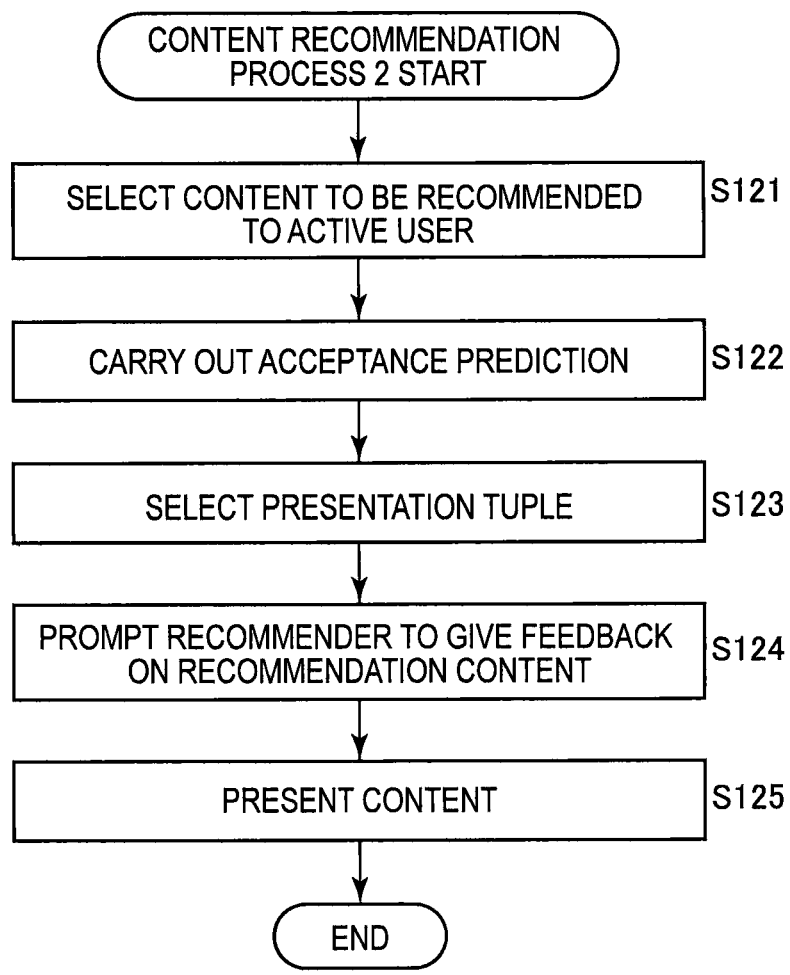
FIG. 28 is a flowchart illustrating a second embodiment of a content recommendation process.

In step S164, in a similar way to step S124 of FIG. 28, the recommender is prompted to give feedback on the recommendation content.

Figure 29:
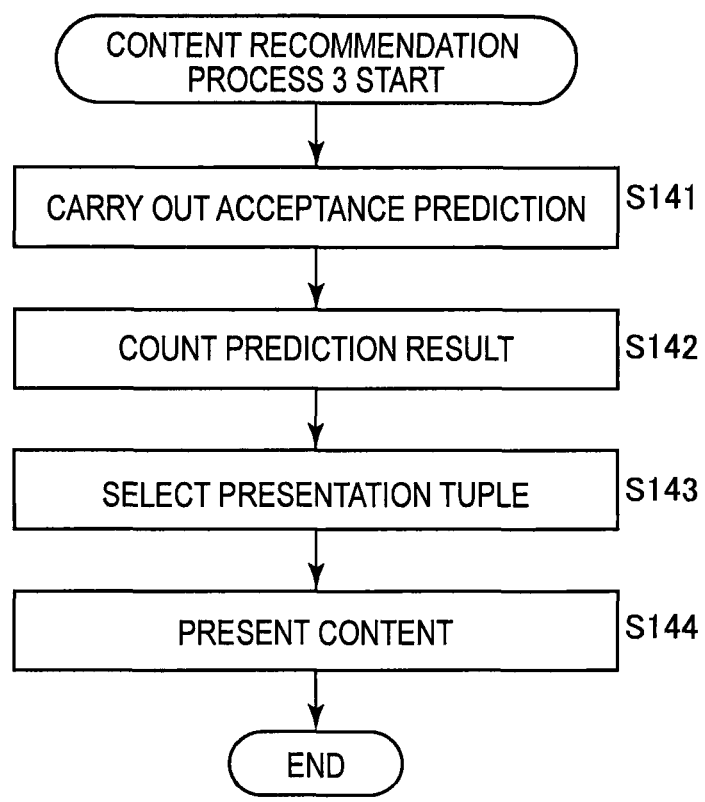
FIG. 29 is a flowchart illustrating a third embodiment of a content recommendation process.

In step S165, in a similar way to step S125 of FIG. 29, the content is presented. Accordingly, when the recommendation content is presented to the user terminal 12 of each active user, at least one of the recommender and the feedback given to the recommendation content by the recommender is presented along with the recommendation content.

The process is then finished.

In this way, for example, when content promotion is carried out, a highly influential user that is readily accepted by many active users or feedback given by the corresponding user is preferentially presented along with the content. This increases the possibility that each active user will accept the presented content.

(User Recommendation Process)

Figure 33:
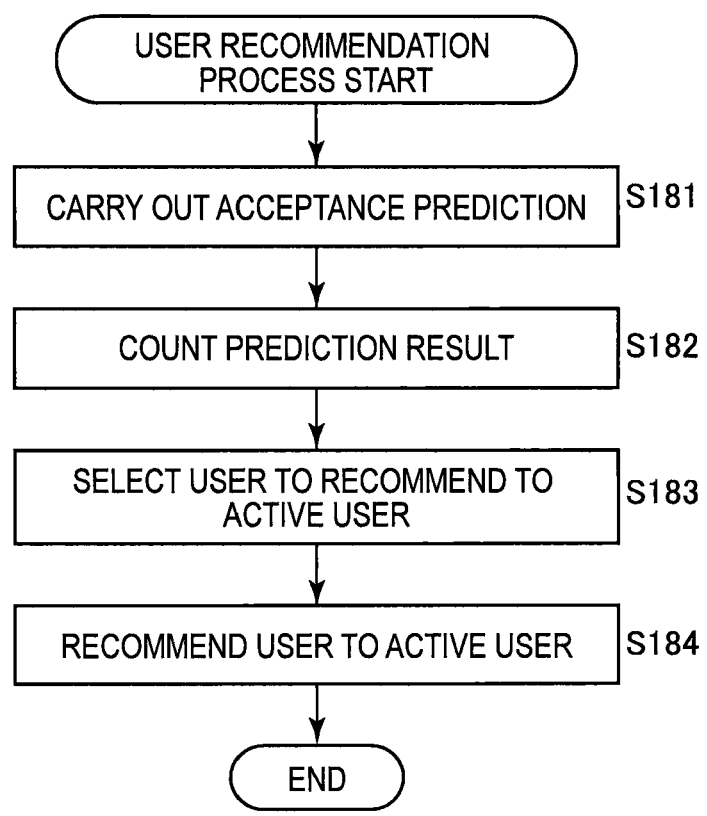
FIG. 33 is a flowchart illustrating a user recommendation process.

Next, the user recommendation process carried out by the server 11 will be described with reference to the flowchart of FIG. 33.

In addition, this process finds a user that is readily accepted by active users, in other words, finds the user that easily influences the active users, and presents the user to the active users.

In step S181, the acceptance prediction unit 53 carries out acceptance prediction. In particular, the acceptance prediction unit 53 uses a similar process to step S101 of FIG. 20 to carry out the acceptance prediction of active users on the tuple including at least the user, that is, the CUF tuple, the CU tuple, the UF tuple, or the U tuple. The acceptance prediction unit 53 notifies the prediction counting unit 30 of the prediction result.

In step S182, the prediction counting unit 30 counts the prediction result. In particular, the prediction counting unit 30 uses a similar process to step S142 of FIG. 29 to obtain an average value of the predicted acceptance degrees per user ID (U tuple ID). The prediction counting unit 30 notifies the presentation tuple selection unit 33 of the counted result.

In step S183, the presentation tuple selection unit 33 selects the user to be recommended to the active user. In particular, the presentation tuple selection unit 33 selects a predetermined number of U tuples in descending order having higher predicted acceptance degrees as the presentation tuples. The users included in the presentation tuples are thus users to be recommended to the active users (hereinafter referred to as recommendation users in this process). The users included in the U tuples having higher predicted acceptance degrees are thus preferentially selected as the recommendation users.

The presentation tuple selection unit 33 then notifies the presentation control unit 34 of the presentation tuples.

In step S184, the server 11 recommends the user to the active user. In particular, the presentation control unit 34 acquires information associated with the recommender included in the presentation tuple from the user DB 27. In addition, the presentation control unit 34 acquires information associated with the feedback given by the recommendation user from the information stored in the feedback DB 23. In addition, the presentation control unit 34 acquires information (metadata) associated with the content as the target of the acquired feedback from the content metadata DB 28.

The presentation control unit 34 generates display data for displaying a user recommendation screen for recommending the recommendation user to the active user based on the acquired information. The presentation control unit 34 then transmits the generated display data to the user terminal 12 of the active user via the communication unit 21 and the network 13.

The user terminal 12 of the active user displays the user recommendation screen based on the display data received from the server 11. In this case, at least a portion of the content on which the feedback is given by the recommendation user and contents of the feedback is presented along with information associated with the recommendation user.

The process is then finished.

In this way, it is possible to recommend the user that is readily accepted by the active user.

As described above, for example, the active user can carry out determination such as purchasing or using unknown content as well as proper feedback information on other users.

In addition, a service provider can expect the active user to accept more contents or users, and purchase and use opportunities of contents or services to increase.

2. MODIFIED EXAMPLES

Hereinafter, modified examples of the embodiments of the present disclosure will be described.

Modified Example 1

In the description above, when the acceptance prediction is counted, an average value of the predicted acceptance degrees is calculated, and the presentation tuple or the like is selected based on the average value. However, a statistic other than the average value may be employed. For example, a sum, a maximum, or a variance of the predicted acceptance degrees may be used, or a combination of a plurality of statistics may be used.

Modified Example 2

In addition, in the description above, the acceptance model is generated and the predicted acceptance degree is obtained based on the meta feedback on the CUF tuple. However, the present disclosure may use the meta feedback on the CF tuple, for example.

That is, the content and the meta feedback on the feedback on the corresponding content may be collected, the acceptance model may be generated and the predicted acceptance degrees may be obtained based on the collected meta feedbacks. In this case, it is possible to carry out the process using the predicted acceptance degree with respect to the CF tuple or the F tuple among the content recommendation processes described above.

Modified Example 3

In addition, in the description above, the tuples are selected in descending order having higher predicted acceptance degrees when the presentation tuple is selected. However, other methods may be employed to preferentially select the tuples having higher predicted acceptance degrees. For example, the tuples having the predicted acceptance degrees greater than or equal to a threshold may be selected.

[Configuration Example of Computer]

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

Figure 34:
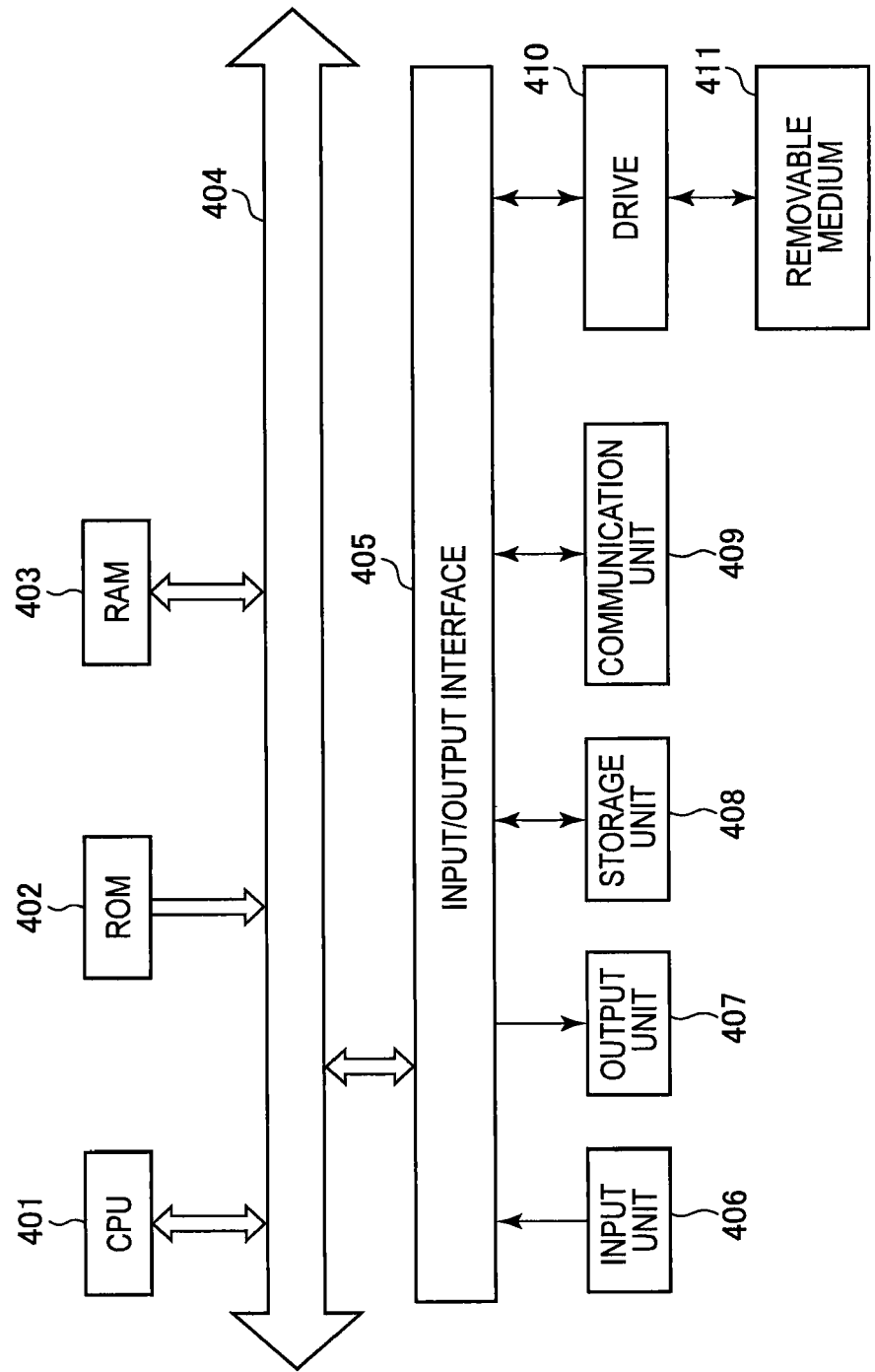
FIG. 34 is a block diagram illustrating a configuration example of a computer.

FIG. 34 is a block diagram showing a configuration example of the hardware of a computer that executes the series of processes described earlier according to a program.

In the computer, a central processing unit (CPU) 401, a read only memory (ROM) 402 and a random access memory (RAM) 403 are mutually connected by a bus 404.

An input/output interface 405 is also connected to the bus 404. An input unit 406, an output unit 407, a storage unit 408, a communication unit 419, and a drive 410 are connected to the input/output interface 405.

The input unit 406 is configured from a keyboard, a mouse, a microphone or the like. The output unit 407 configured from a display, a speaker or the like. The storage unit 408 is configured from a hard disk, a non-volatile memory or the like. The communication unit 419 is configured from a network interface or the like. The drive 410 drives a removable media 411 such as a magnetic disk, an optical disk, a magneto-optical disk, a semiconductor memory or the like.

In the computer configured as described above, the CPU 401 loads a program that is stored, for example, in the storage unit 408 onto the RAM 403 via the input/output interface 405 and the bus 404, and executes the program. Thus, the above-described series of processing is performed.

Programs to be executed by the computer (the CPU 401) are provided being recorded in the removable media 411 which is a packaged media or the like. Also, programs may be provided via a wired or wireless transmission medium, such as a local area network, the Internet or digital satellite broadcasting.

In the computer, by inserting the removable media 411 into the drive 410, the program can be installed in the storage unit 408 via the input/output interface 405. Further, the program can be received by the communication unit 419 via a wired or wireless transmission media and installed in the storage unit 408. Moreover, the program can be installed in advance in the ROM 402 or the storage unit 408.

It should be noted that the program executed by a computer may be a program that is processed in time series according to the sequence described in this specification or a program that is processed in parallel or at necessary timing such as upon calling.

In the present disclosure, the term "system" means a general apparatus that is configured using a plurality of devices and mechanisms.

It should be understood by those skilled in the art that various modifications, combinations, sub-combinations and alterations may occur depending on design requirements and other factors insofar as they are within the scope of the appended claims or the equivalents thereof.

Furthermore, the present technology may also be configured as follows, for example.

(1)

An information processing device including:

a collection unit configured to collect meta feedback that is feedback on a combination including a content, a user, and feedback on the content of the user; and a prediction unit configured to obtain a predicted acceptance degree that is a prediction value of a degree to which an active user that is a target user accepts a combination including at least one of the content, the user, and the feedback, based on the collected meta feedback.

(2)

The information processing device according to (1), further including:

a selection unit configured to select a combination including a content to be presented to the active user and at least one of the user that has given feedback on the content and the feedback, based on the predicted acceptance degree; and a presentation control unit configured to control the content included in the selected combination and at least one of the user and the feedback included in the selected combination to be presented to the active user.

(3)

The information processing device according to (2), wherein the selection unit preferentially selects a combination having a higher predicted acceptance degree.

(4)

The information processing device according to (1), further including:

a selection unit configured to select a combination of the content and the user that prompts provision of feedback based on the predicted acceptance degree of the active user with respect to the combination of the content and the user or the predicted acceptance degree of the active user with respect to the user;

a guidance unit configured to prompt the user included in the selected combination to give feedback on the content included in the selected combination; and a presentation control unit configured to control the content included in the selected combination and at least one of the user included in the selected combination and the feedback given by the user to be presented to the active user.

(5)

The information processing device according to (4), wherein the selection unit preferentially selects a combination of the content and the user having a higher predicted acceptance degree or a combination of the user and the content including the user having the higher predicted acceptance degree.

(6)

The information processing device according to (1), further including:

a counting unit configured to count the predicted acceptance degrees of a plurality of active users for each user, for each feedback, or for each combination of the user and the feedback;

a selection unit configured to select a combination including a content to be presented and at least one of the user and the feedback, based on the counted result of the predicted acceptance degrees; and a presentation control unit configured to control the content included in the selected combination and at least one of the user and the feedback included in the selected combination to be presented.

(7)

The information processing device according to (6), wherein the selection unit preferentially selects the combination including the user and the feedback having higher predicted acceptance degrees of the plurality of active users.

(8)

The information processing device according to (1), further including:

a counting unit configured to count the predicted acceptance degrees of a plurality of active users with respect to a combination of the content and the user or the predicted acceptance degrees of the plurality of active users with respect to the user for each user;

a selection unit configured to select a combination of the content and the user that prompts provision of feedback, based on the counted result of the predicted acceptance degrees;

a guidance unit configured to prompt the user included in the selected combination to give feedback on the content included in the selected combination; and a presentation control unit configured to control the content included in the selected combination and at least one of the user included in the selected combination and the feedback given by the user to be presented.

(9)

The information processing device according to (8), wherein the selection unit preferentially selects a combination including the user having higher predicted acceptance degrees of the plurality of active users.

(10)

The information processing device according to (1), further including:

a counting unit configured to count the predicted acceptance degree of the active user with respect to the combination including at least the user for each user;

a selection unit configured to preferentially select the user having a higher predicted acceptance degree of the active user; and a presentation control unit configured to control the selected user to be presented to the active user.

(11)

The information processing device according to any of (1) to (10), wherein the prediction unit includes:

an acceptance model generation unit configured to generate an acceptance model for obtaining the predicted acceptance degree, based on the collected meta feedback; and an acceptance prediction unit configured to obtain the predicted acceptance degree based on the acceptance model.

(12)
An information processing method including:
collecting, by an information processing device, meta feedback that is feedback on a combination including a content, a user, and feedback on the content of the user; and
obtaining, by the information processing device, a predicted acceptance degree that is a prediction value of a degree to which an active user that is a target user accepts a combination including at least one of the content, the user, and the feedback, based on the collected meta feedback.

(13)
A program for causing a computer to execute processes including:
collecting meta feedback that is feedback on a combination including a content, a user, and feedback on the content of the user; and
obtaining a predicted acceptance degree that is a prediction value of a degree to which an active user that is a target user accepts a combination including at least one of the content, the user, and the feedback, based on the collected meta feedback.

(14)
An information processing device including:
a collection unit configured to collect meta feedback that is feedback on a combination including a content and feedback on the content; and
a prediction unit configured to obtain a predicted acceptance degree that is a prediction value of a degree to which an active user that is a target user accepts a combination including at least one of the content and the feedback, based on the collected meta feedback.

(15)
The information processing device according to (14), further including:
a selection unit configured to select a combination including a content to be presented to the active user and the feedback given on the content, based on the predicted acceptance degree; and
a presentation control unit configured to control the content included in the selected combination and the feedback included in the selected combination to be presented to the active user.

(16)
The information processing device according to (14), further including:
a counting unit configured to count the predicted acceptance degrees of a plurality of active users for each feedback;
a selection unit configured to select a combination including the content to be presented and the feedback, based on the counted result of the predicted acceptance degrees; and
a presentation control unit configured to control the content included in the selected combination and the feedback included in the selected combination to be presented.

(17)
The information processing device according to (14), wherein the prediction unit includes:
an acceptance model generation unit configured to generate an acceptance model for obtaining the predicted acceptance degree, based on the collected meta feedback; and
an acceptance prediction unit configured to obtain the predicted acceptance degree based on the acceptance model.

(18)
An information processing method including:
collecting, by an information processing device, meta feedback that is feedback on a combination including a content and feedback on the content; and
obtaining, by the information processing device, a predicted acceptance degree that is a prediction value of a degree to which an active user that is a target user accepts a combination including at least one of the content and the feedback, based on the collected meta feedback.

(19)
A program for causing a computer to execute processes including:
collecting meta feedback that is feedback on a combination including a content and feedback on the content; and
obtaining a predicted acceptance degree that is a prediction value of a degree to which an active user that is a target user accepts a combination including at least one of the content and the feedback, based on the collected meta feedback.

The present disclosure contains subject matter related to that disclosed in Japanese Priority Patent Application JP 2011-168975 filed in the Japan Patent Office on Aug. 2, 2011, the entire content of which is hereby incorporated by reference.

What is claimed is:

1. An information processing device comprising:
a collection unit configured to collect meta feedback that is feedback on a combination including a content, a user, and feedback on the content of the user; and
a prediction unit configured to obtain a predicted acceptance degree that is a prediction value of a degree to which an active user that is a target user accepts a combination including at least one of the content, the user, and the feedback, based on the collected meta feedback, wherein the prediction unit includes:
an acceptance model generation unit configured to generate an acceptance model for obtaining the predicted acceptance degree, based on the collected meta feedback, and
an acceptance prediction unit configured to obtain the predicted acceptance degree based on the acceptance model.

2. The information processing device according to claim 1, further comprising:
a selection unit configured to select a combination including a content to be presented to the active user and at least one of the user that has given feedback on the content and the feedback, based on the predicted acceptance degree; and
a presentation control unit configured to control the content included in the selected combination and at least one of the user and the feedback included in the selected combination to be presented to the active user.

3. The information processing device according to claim 2, wherein the selection unit preferentially selects a combination having a higher predicted acceptance degree.

4. The information processing device according to claim 1, further comprising:
a selection unit configured to select a combination of the content and the user that prompts provision of feedback based on the predicted acceptance degree of the active user with respect to the combination of the content and the user or the predicted acceptance degree of the active user with respect to the user;
a guidance unit configured to prompt the user included in the selected combination to give feedback on the content included in the selected combination; and
a presentation control unit configured to control the content included in the selected combination and at least one of the user included in the selected combination and the feedback given by the user to be presented to the active user.

5. The information processing device according to claim 4, wherein the selection unit preferentially selects a combination of the content and the user having a higher predicted acceptance degree or a combination of the user and the content including the user having the higher predicted acceptance degree.

6. The information processing device according to claim 1, further comprising:
a counting unit configured to count the predicted acceptance degrees of a plurality of active users for each user, for each feedback, or for each combination of the user and the feedback;
a selection unit configured to select a combination including a content to be presented and at least one of the user and the feedback, based on the counted result of the predicted acceptance degrees; and
a presentation control unit configured to control the content included in the selected combination and at least one of the user and the feedback included in the selected combination to be presented.

7. The information processing device according to claim 6, wherein the selection unit preferentially selects the combination including the user and the feedback having higher predicted acceptance degrees of the plurality of active users.

8. The information processing device according to claim 1, further comprising:
a counting unit configured to count the predicted acceptance degrees of a plurality of active users with respect to a combination of the content and the user or the predicted acceptance degrees of the plurality of active users with respect to the user for each user;
a selection unit configured to select a combination of the content and the user that prompts provision of feedback, based on the counted result of the predicted acceptance degrees;
a guidance unit configured to prompt the user included in the selected combination to give feedback on the content included in the selected combination; and
a presentation control unit configured to control the content included in the selected combination and at least one of the user included in the selected combination and the feedback given by the user to be presented.

9. The information processing device according to claim 8, wherein the selection unit preferentially selects a combination including the user having higher predicted acceptance degrees of the plurality of active users.

10. The information processing device according to claim 1, further comprising:
a counting unit configured to count the predicted acceptance degree of the active user with respect to the combination including at least the user for each user;
a selection unit configured to preferentially select the user having a higher predicted acceptance degree of the active user; and
a presentation control unit configured to control the selected user to be presented to the active user.

11. An information processing method comprising:
collecting, by an information processing device, meta feedback that is feedback on a combination including a content, a user, and feedback on the content of the user; and
obtaining, by the information processing device, a predicted acceptance degree that is a prediction value of a degree to which an active user that is a target user accepts a combination including at least one of the content, the user, and the feedback, based on the collected meta feedback, wherein the obtaining the predicted acceptance degree comprises:
generating an acceptance model for obtaining the predicted acceptance degree, based on the collected meta feedback, and
obtaining the predicted acceptance degree based on the acceptance model.

12. A non-transitory computer-readable medium having embodied thereon a program, which when executed by a processor of a computer causes the processor to execute processes comprising:
collecting meta feedback that is feedback on a combination including a content, a user, and feedback on the content of the user; and
obtaining a predicted acceptance degree that is a prediction value of a degree to which an active user that is a target user accepts a combination including at least one of the content, the user, and the feedback, based on the collected meta feedback, wherein the obtaining the predicted acceptance degree comprises:
generating an acceptance model for obtaining the predicted acceptance degree, based on the collected meta feedback, and
obtaining the predicted acceptance degree based on the acceptance model.

13. An information processing device comprising:
a collection unit configured to collect meta feedback that is feedback on a combination including a content and feedback on the content; and
a prediction unit configured to obtain a predicted acceptance degree that is a prediction value of a degree to which an active user that is a target user accepts a combination including at least one of the content and the feedback, based on the collected meta feedback, wherein the prediction unit includes:
an acceptance model generation unit configured to generate an acceptance model for obtaining the predicted acceptance degree, based on the collected meta feedback, and
an acceptance prediction unit configured to obtain the predicted acceptance degree based on the acceptance model.

14. The information processing device according to claim 13, further comprising:
a selection unit configured to select a combination including a content to be presented to the active user and the feedback given on the content, based on the predicted acceptance degree; and
a presentation control unit configured to control the content included in the selected combination and the feedback included in the selected combination to be presented to the active user.

15. The information processing device according to claim 13, further comprising:
a counting unit configured to count the predicted acceptance degrees of a plurality of active users for each feedback;
a selection unit configured to select a combination including the content to be presented and the feedback, based on the counted result of the predicted acceptance degrees; and
a presentation control unit configured to control the content included in the selected combination and the feedback included in the selected combination to be presented.

16. An information processing method comprising:

collecting, by an information processing device, meta feedback that is feedback on a combination including a content and feedback on the content; and obtaining, by the information processing device, a predicted acceptance degree that is a prediction value of a degree to which an active user that is a target user accepts a combination including at least one of the content and the feedback, based on the collected meta feedback, wherein the obtaining the predicted acceptance degree comprises:

generating an acceptance model for obtaining the predicted acceptance degree, based on the collected meta feedback, and obtaining the predicted acceptance degree based on the acceptance model.

17. A non-transitory computer-readable medium having embodied thereon a program, which when executed by a processor of a computer causes the processor to execute processes comprising:

collecting meta feedback that is feedback on a combination including a content and feedback on the content; and obtaining a predicted acceptance degree that is a prediction value of a degree to which an active user that is a target user accepts a combination including at least one of the content and the feedback, based on the collected meta feedback, wherein the obtaining the predicted acceptance degree comprises:

generating an acceptance model for obtaining the predicted acceptance degree, based on the collected meta feedback, and obtaining the predicted acceptance degree based on the acceptance model.

* * * * *